(12) United States Patent
Uchiyama et al.

(10) Patent No.: US 8,765,321 B2
(45) Date of Patent: Jul. 1, 2014

(54) TRANSITION METAL NITRIDE, SEPARATOR FOR FUEL CELLS, FUEL CELL STACK, FUEL CELL VEHICLE, METHOD OF MANUFACTURING TRANSITION METAL NITRIDE, AND METHOD OF MANUFACTURING SEPARATOR FOR FUEL CELLS

(71) Applicants: Noriko Uchiyama, Kanagawa (JP); Nobutaka Chiba, Kanagawa (JP); Makoto Kano, Kanagawa (JP)

(72) Inventors: Noriko Uchiyama, Kanagawa (JP); Nobutaka Chiba, Kanagawa (JP); Makoto Kano, Kanagawa (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 13/748,327

(22) Filed: Jan. 23, 2013

(65) Prior Publication Data
US 2013/0143138 A1    Jun. 6, 2013

Related U.S. Application Data

(62) Division of application No. 12/066,020, filed as application No. PCT/JP2006/317747 on Sep. 7, 2006.

(30) Foreign Application Priority Data

Sep. 8, 2005  (JP) .................................. 2005-261194
Sep. 8, 2005  (JP) .................................. 2005-261325

(51) Int. Cl.
*H01M 2/16*    (2006.01)
*H01M 4/66*    (2006.01)

(52) U.S. Cl.
USPC ........................... 429/457; 429/518; 429/519

(58) Field of Classification Search
None
See application file for complete search history.

(56) References Cited

U.S. PATENT DOCUMENTS

| 4,496,401 A | 1/1985 | Dawes et al. |
| 8,298,724 B2 * | 10/2012 | Uchiyama et al. ............ 429/518 |
| 2008/0050635 A1 | 2/2008 | Gao et al. |

FOREIGN PATENT DOCUMENTS

| JP | 58-126977 A | 7/1983 | |
| JP | 10-228914 A | 8/1998 | |
| JP | 2000-045061 A | 2/2000 | |
| JP | 2001-006694 A | 1/2001 | |
| JP | 2001-006713 A | 1/2001 | |
| JP | 2001006694 A * | 1/2001 | ............ H01M 8/02 |
| JP | 2002047554 A | 2/2002 | |
| JP | 2007-39786 A | 2/2007 | |
| WO | WO 2005/124910 A1 | 12/2005 | |

OTHER PUBLICATIONS

"Effect of Low-Temperature Plasma Nitriding on Corrosion of 304L Stainless Steel in Sulfate and Chloride Solutions" Flis et al., Journal of the Electrochemical Society, 151 (11) B573-B580, 2004.*
JP 2001006694 A—machine English translation.*

(Continued)

*Primary Examiner* — Patrick Ryan
*Assistant Examiner* — Lucas J O'Donnell
(74) *Attorney, Agent, or Firm* — Foley & Lardner LLP

(57) ABSTRACT

A transition metal nitride is obtained by a nitriding treatment of a surface of a base material including a transition metal or an alloy of the transition metal, and the transition metal nitride has a crystal structure of an $M_4N$ type and a crystal structure of an $\epsilon\text{-}M_{2-3}N$ type, and is formed over a whole area of the surface of the base material and continuously in a depth direction from the surface.

18 Claims, 16 Drawing Sheets

(56) References Cited

OTHER PUBLICATIONS

Naoki Yasumaru et al., "Nitrogen-induced Phase Transformation in Type 304 Austenitic Stainless Steel," Journal Japan Institute of Metals, vol. 50, No. 4, 1986, pp. 362-368.

Hisahiko Yamanaka, "Ion Chikkaho," 1$^{st}$ edition, The Nikkan Kogyo Shinbun, Ltd., Jul. 10, 1976, pp. 4-5 and 70-74.

Office Action issued by Canadian Intellectual Property Office dated Oct. 7, 2009 for Canadian Patent Application No. 2,621,772.

Search Report issued by European Office dated Oct. 30, 2009 for European Patent Application No. 06810045.2.

Borges et al., "Decreasing chromium precipitation in AISI 304 stainless steel during the plasma-nitriding process", Surface and Coatings Technology, 2000, vol. 123 (2-3), pp. 112-121.

Olfe et al., "Wear protection and corrosion resistance of austenitic stainless steel due to plasma nitriding", Vakuum in Forschung und Praxis, 2000, vol. 12(4), pp. 253-258.

Flis et al., "Corrosion behaviour of stainless steels after plasma and ammonia nitriding", Surface Engineering, 1989, vol. 5(2), pp. 151-157.

Xiaolei et al., "A comparative study on microstructure of the plasma-nitrided layers on austenitic stainless steel and pure Fe", Surface & Coatings Technology, 2005, vol. 192, pp. 220-224.

Non-Final office Action U.S. Appl. No. 12/066,020 dated Oct. 24, 2012.

Final Office Action U.S. Appl. No. 12/066,020 dated Feb. 9, 2012.

English Machine Translation of JP 2002047554 A to Igarashi et al.

Non-Final Office Action U.S. Appl. No. 12/066,020 dated Aug. 1, 2011.

Tian et al., Physics Letters A 299, (2002) 577-580, "Nitrogen depth profiles in plasma implanted stainless steel".

Non-Final Office Action U.S. Appl. No. 12/066,020 dated Jun. 17, 2011.

* cited by examiner

FIG. 3
(a)
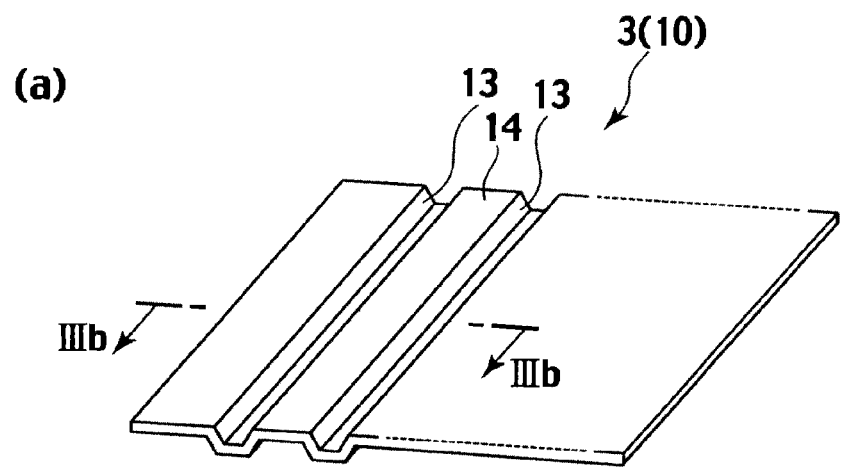
(b)
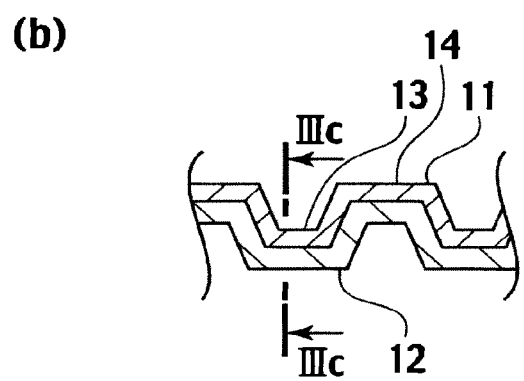
(c)
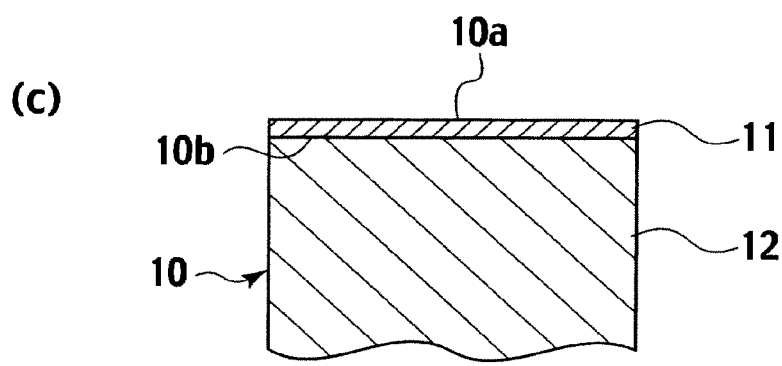

FIG. 4
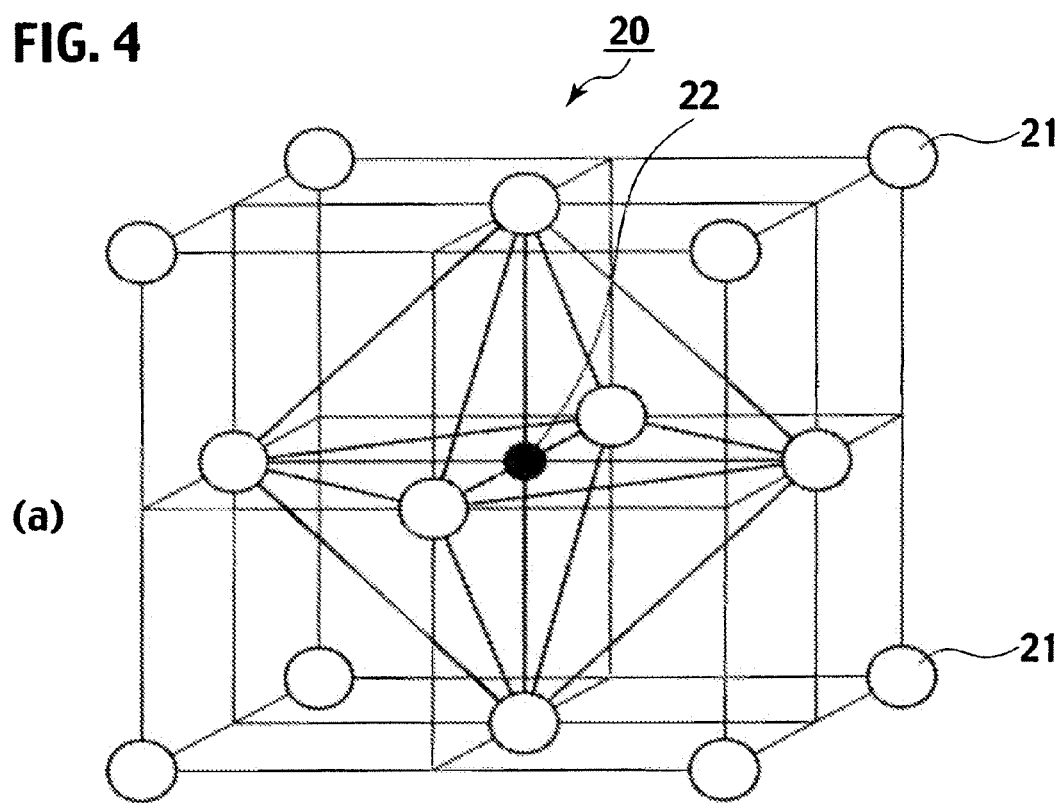
(a)
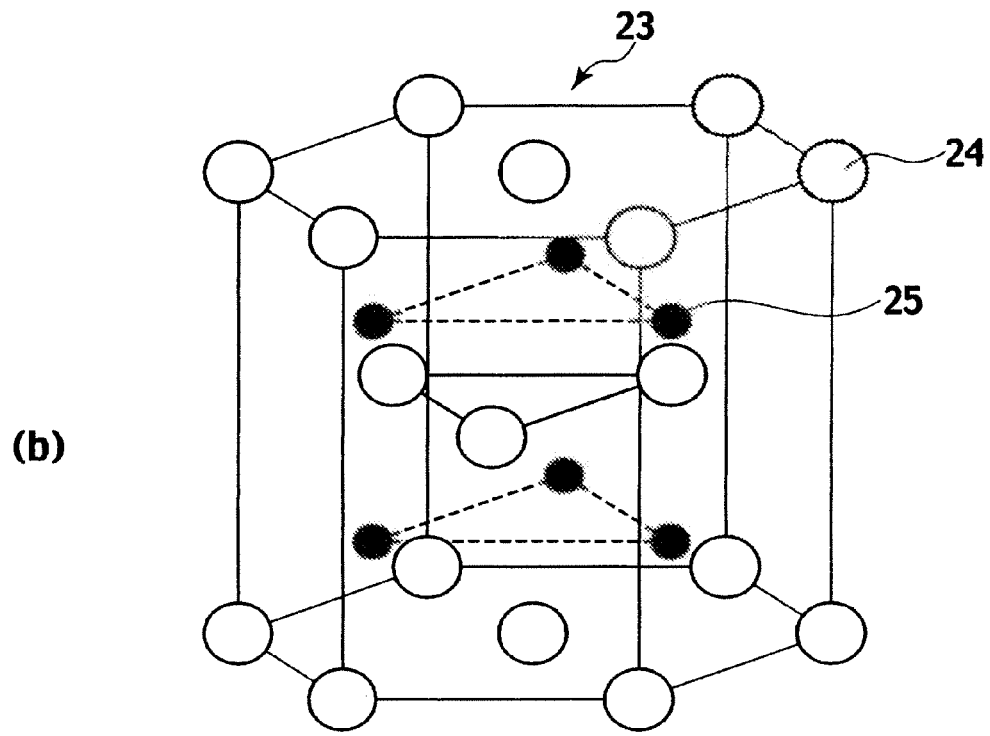
(b)
○ M
● N

FIG. 6
(a)
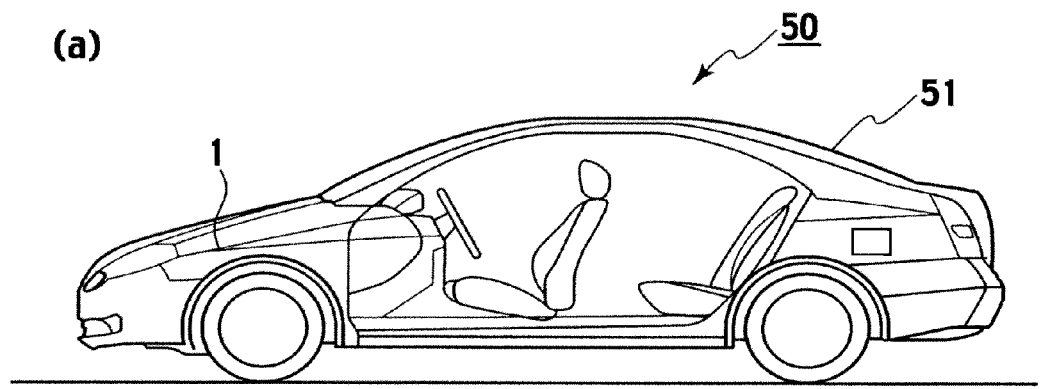
(b)
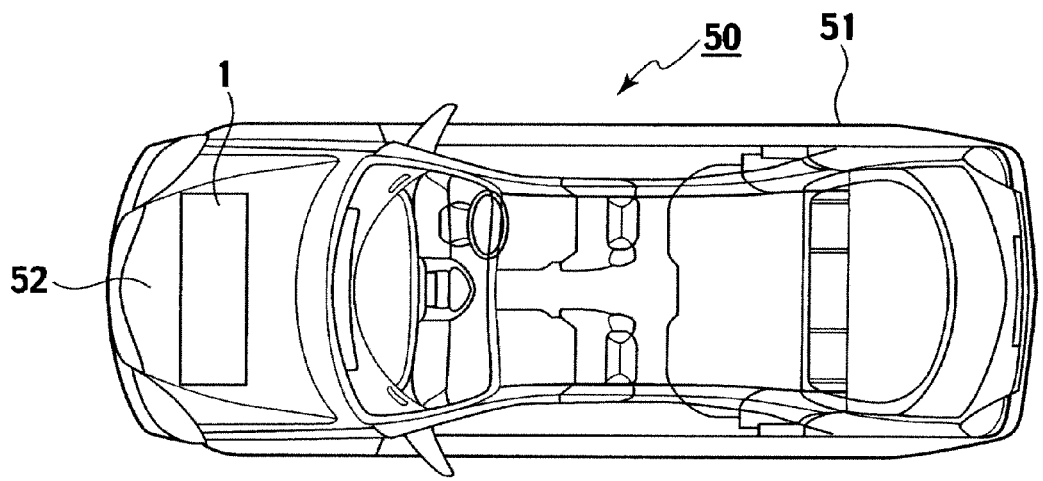

FIG. 7
(a)
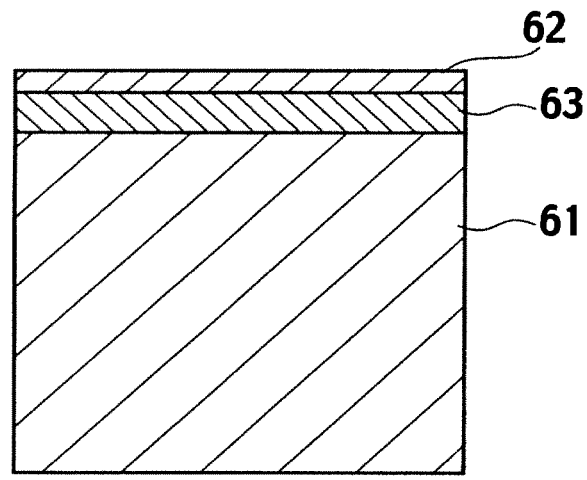
(b)
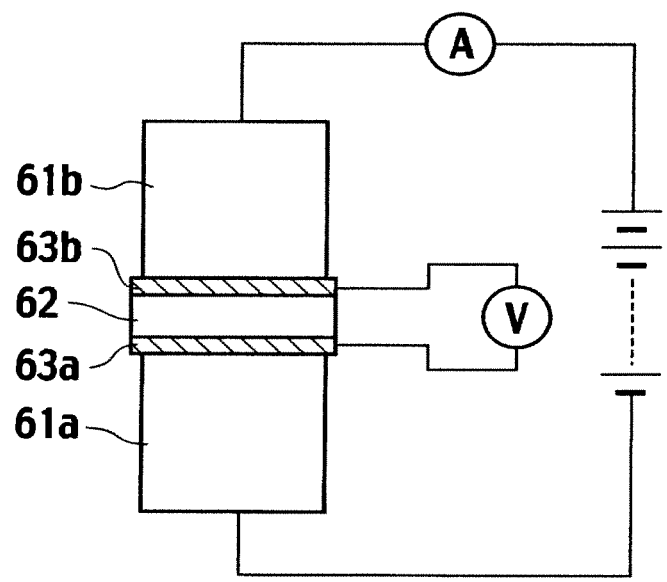

FIG. 9
(a)
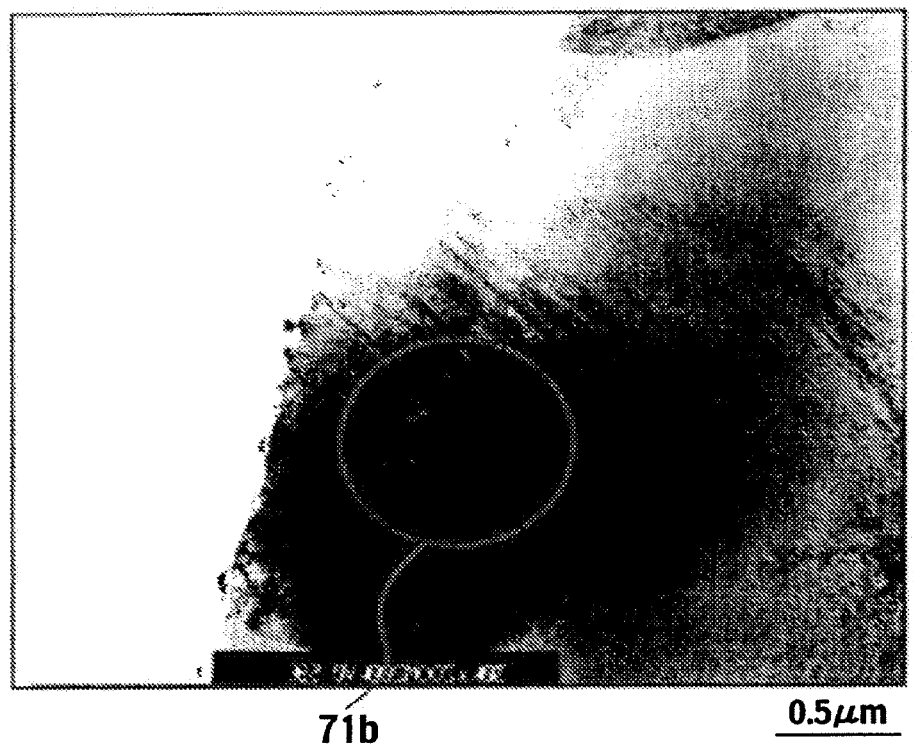
71b
0.5 μm
(b)
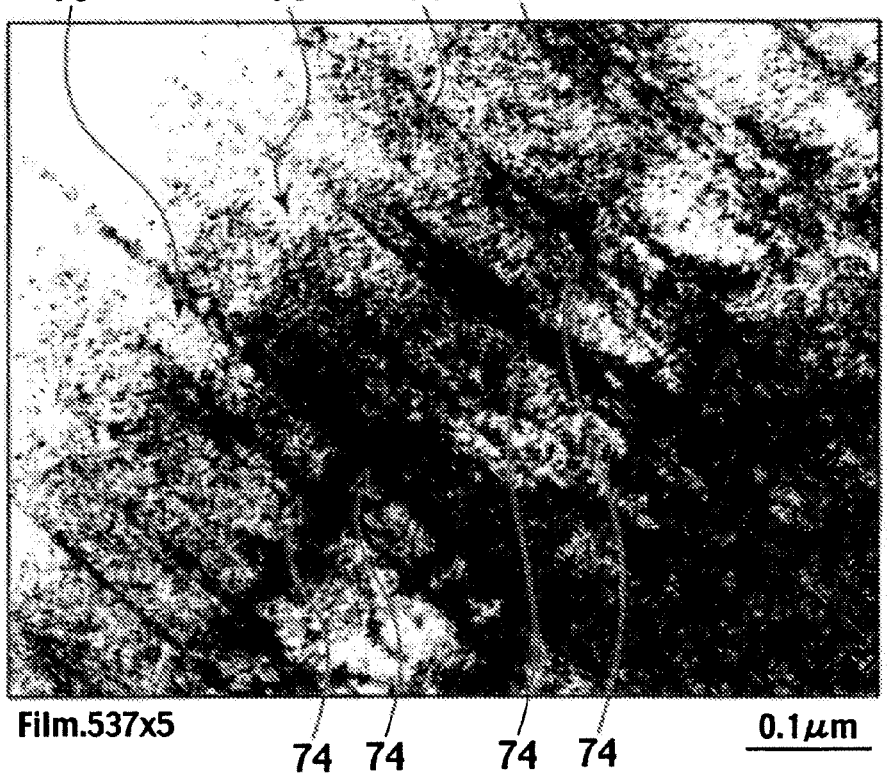
0.1 μm

CROSS SECTION (×2500)

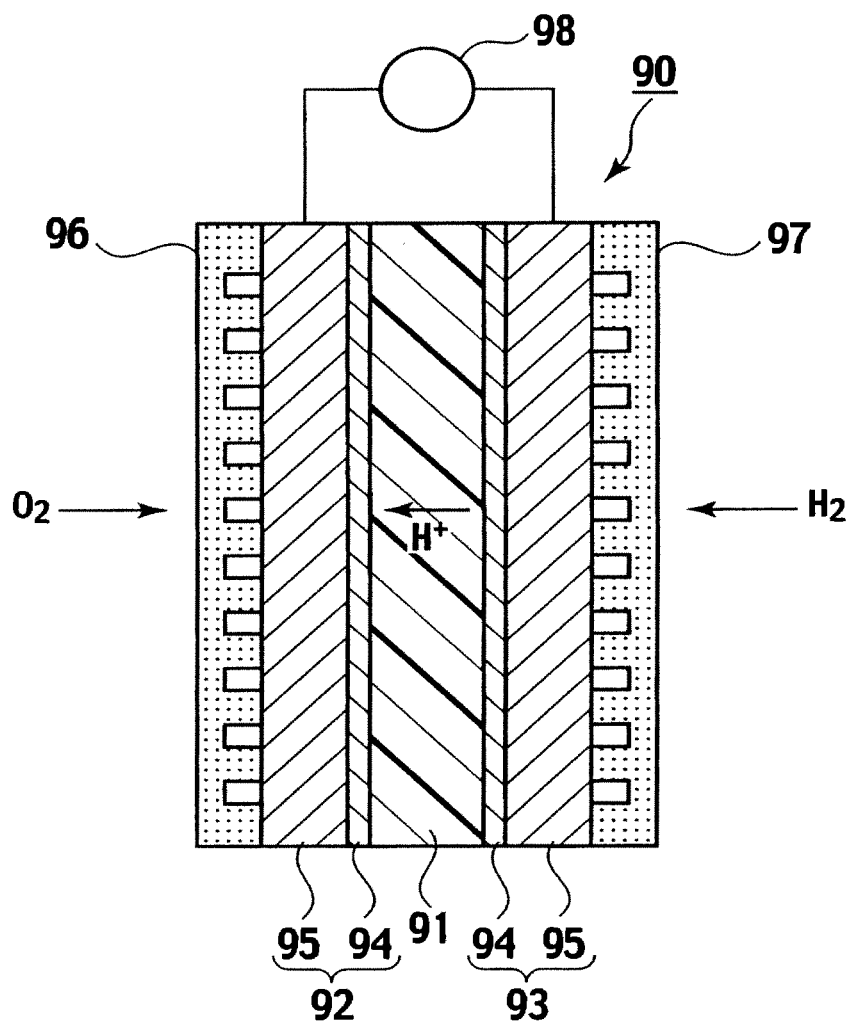

TRANSITION METAL NITRIDE, SEPARATOR FOR FUEL CELLS, FUEL CELL STACK, FUEL CELL VEHICLE, METHOD OF MANUFACTURING TRANSITION METAL NITRIDE, AND METHOD OF MANUFACTURING SEPARATOR FOR FUEL CELLS

FIELD OF ART

This invention relates to a transition metal nitride, a separator for fuel cells, a fuel cell stack, a fuel cell vehicle, a method of manufacturing a transition metal nitride, and a method of manufacturing a separator for fuel cells, and in particular, to a separator for fuel cells of a polymer electrolyte type that is made by using a stainless steel.

BACKGROUND ART

It has been considered from the viewpoint of global environment protection to use a fuel cell as a power supply for a motor operable in place of an internal engine for automobiles, to drive an automobile by the motor. The fuel cell does not need the use of a fossil fuel accompanied by the problem of resource depletion, and can be free from emissions such as exhaust gases. The fuel cell further has eminent advantages, such that it is fairly noise-free, and affords the efficiency of energy collection to be higher than other energy machinery.

Fuel cells are categorized in accordance with the kind of electrolyte in use, into a polymer electrolyte type, a phosphate type, a molten carbonate type, a solid oxide type, etc. As one of them, the polymer electrolyte type (PEFC: Polymer Electrolyte Fuel Cell) is a fuel cell that employs as its electrolyte a membrane of electrolyte of a polymer having a proton exchange group in the molecule, making use of the function the polymer electrolyte membrane has as a proton-conductive electrolyte with a saturated content of water. This polymer electrolyte fuel cell works at relatively low temperatures, and with a high efficiency of power generation. Moreover, the polymer electrolyte fuel cell is allowed to be small in size and light in weight, together with other associated equipment, and is expected to have a variety of applications including mounting to electric vehicles.

The above-noted polymer electrolyte fuel cell includes a fuel cell stack. The fuel cell stack is integrally configured as a lamination of a plurality of unit cells each working as a fundamental unit for power generation by electrochemical reactions, the lamination being sandwiched with end flanges put on both ends, and held tightened by tie bolts. The unit cells are each configured with a solid polymer electrolyte membrane, and a combination of an anode (hydrogen electrode) and a cathode (oxygen electrode) joined to both sides thereof.

FIG. 16 shows in a sectional view the configuration of a unit cell constituting a fuel cell stack. As shown in FIG. 16, the unit cell 90 has a membrane electrode assembly, in which a solid polymer electrolyte membrane 91 is integrated with a combination of an oxygen electrode 92 and a hydrogen electrode 93 joined to both sides thereof. The oxygen electrode 92 and the hydrogen electrode 93 have a two-layered structure configured with a reaction film 94 and a gas diffusion layer (GDL) 95, the reaction film 94 contacting the solid polymer electrolyte membrane 91. On both sides of the combination of oxygen electrode 92 and hydrogen electrode 93, an oxygen electrode side separator 96 and a hydrogen electrode side separator 97 are arranged for lamination, respectively. And, by the oxygen electrode side separator 96 and the hydrogen electrode side separator 97, there are defined oxygen as channels, hydrogen gas channels, and cooling water channels.

For manufacture of the unit cell 90 configured as described, the oxygen electrode 92 and the hydrogen electrode 93 are disposed on both sides of the solid polymer electrolyte membrane 91, and integrally joined thereto, typically by a hot pressing method, to form the membrane electrode assembly, and then, the separators 96 and 97 are disposed on both sides of the membrane electrode assembly. The unit cell 90 constitutes a fuel cell, where a gaseous mixture of hydrogen, carbon dioxide, nitrogen, and water vapor is supplied at the side of hydrogen electrode 93, and air with water vapor, at the side of oxygen electrode 92, whereby electrochemical reactions are caused principally at contact surfaces between solid polymer electrolyte membrane 91 and reaction films 94. More specific reactions will be described below.

In the above-noted configuration of unit cell 90, with oxygen gases and hydrogen gases distributed to oxygen gas channels and hydrogen gas channels, respectively, oxygen gases and hydrogen gases are supplied through gas diffusion layers 95 to the reaction films 94, causing the following reactions in the reaction films 94.

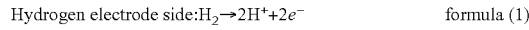

Hydrogen electrode side: $H_2 \rightarrow 2H^+ + 2e^-$      formula (1)

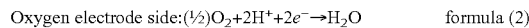

Oxygen electrode side: $(½)O_2 + 2H^+ + 2e^- \rightarrow H_2O$      formula (2)

At the side of hydrogen electrode 93 with hydrogen gas supplied, the reaction of formula (1) proceeds, producing $H^+$ and $e^-$. $H^+$ is hydrated, which moves in the solid polymer electrolyte membrane 91, flowing toward the side of hydrogen electrode 93, while $e^-$ is conducted through a load 98, flowing from the hydrogen electrode 93 to the oxygen electrode 93. At the side of oxygen electrode 92 with $H^+$ and $e^-$ and oxygen gas supplied, the reaction of formula (2) proceeds, generating electric power.

For fuel cells, separators should have a function of electrical connection between unit cells, as described, and need a good conductivity of electricity, and low contact resistances to component materials of gas diffusion layers and the like. Moreover, an electrolyte membrane of solid polymer type, made of a polymer with multiple sulfonate groups, is humidified to employ sulfonate groups for proton exchange, so as to be proton-conductive. For the electrolyte membrane of solid polymer type, which is weakly acidic, the fuel cell separators are required to be corrosive-resistant against sulfate acidities around pH2 to pH3. Still more, for fuel cells, gases to be supplied have temperatures as hot as within 80° C. to 90° C., and it has not simply the hydrogen electrode, where $H^+$ is produced, but also the oxygen electrode, where oxygen as well as air or the like passes, constituting an oxidizing environment with imposition of potentials around 0.6 V to 1 V vs. SHE relative to a standard hydrogen electrode potential. Hence, for the oxygen electrode, as well as for the hydrogen electrode, the fuel cell separator is required to have a corrosion resistance endurable under a strong acidic atmosphere. It is noted that the corrosion resistance now required means a durability that permits the fuel cell separator to have a maintained performance of electric conduction even under a strong acidic environment. In other words, as cations are transferred into humidifying water or production water due to the reaction of formula (2), they are bonded with those sulfonate groups which inherently should have made ways for protons, and thus occupy the sulfonate groups, constituting an environment that deteriorates a power generating characteristic of the electrolyte membrane, where the corrosion resistance should be measured.

To this point, for separators for fuel cells, attempts have been made to employ an electrically well conductive and excellently corrosion-resistive stainless steel or titanium material such as a pure titanium material for industrial use. The stainless steel has a dense passive film formed on the surface with oxides or hydroxides containing chromium as a principal metallic element, hydrates of them, or the like. Likewise, the titanium material has a dense passive film formed on the surface with titanium oxides or titanium hydroxides, hydrates of them, or the like. The stainless steel as well as the titanium material is thus well anti-corrosive.

However, the above-noted passive films have contact resistances to a carbon paper employed typically as a gas diffusion layer. Fuel cells have an over-voltage due to a resistance polarization therein, although for stationary applications affording a waste heat collection, such as by co-generation, the heat efficiency can be enhanced as a total. But, for applications to automobiles, where heat losses due to contact resistances have to be simply wasted outside, through cooling water, from a radiator, the efficiency of power generation is to decrease, as the contact resistances have an increased influence. Further, the decrease in efficiency of power generation is equivalent to an increase in heat dissipation, which leads to the need for installation of an enlarged cooling system, with a greater influence of contact resistances, as an important issue to be solved.

Although fuel cells have a theoretical voltage, which is 1.23 V per unit cell, the voltage that can be actually taken out is dropped due to reaction polarization, gas diffusion polarization, and resistance polarization, and the voltage decreases, as the current to be taken out increases. Further, in applications to automobiles, where increasing power density per unit volume or unit weight is wanted, the service tends to have a greater current density than for stationary use, e.g., a current density of 1 A/cm². For the current density of 1 A/cm², if the contact resistance between separator and carbon paper is kept within a range of 40 mΩ·cm² or less, the efficiency reduction due to contact resistance is considered as controllable.

In this respect, there is proposed a separator for fuel cells in Japanese Patent Application Laying-Open Publication No. 10-228914, in which a stainless steel is press-formed, and thereafter, a gold skin is formed directly on the surface to be brought into contact with an electrode. Further, there is proposed a separator for fuel cells in Japanese Patent Application Laying-Open Publication No. 2001-6713, in which a stainless steel is molded in the form of a separator for fuel cells, and thereafter, for the surfaces that will have contact resistances when brought into contact with an electrode, their passive films are removed, and a precious metal or a precious metal alloy is attached.

DISCLOSURE OF INVENTION

However, coating a precious metal on surfaces of a separator for fuel cells is troublesome, and leads to an increase in cost.

The present invention has been devised in view of such points, and it is an object thereof to provide a separator for fuel cells and a fuel cell stack with a low contact resistance between separator and electrode, excellent corrosion resistance, and low cost, and a fuel cell vehicle including the fuel cell stack.

According to an aspect of the present invention, a transition metal nitride is obtained by a nitriding treatment of a surface of a base material including a transition metal or an alloy of the transition metal, and the transition metal nitride has a crystal structure of an $M_4N$ type and a crystal structure of an $\epsilon$-$M_{2-3}N$ type, and is formed over a whole area of the surface of the base material and continuously in a depth direction from the surface.

According to an aspect of the present invention, a separator for fuel cells comprises a base material comprising a transition metal or an alloy of the transition metal, and a nitrided layer of a transition metal nitride according to the present invention formed in a depth direction from a surface of the base material.

According to an aspect of the present invention, a method of manufacturing a transition metal nitride to be formed on a surface of a base material comprising a transition metal or an alloy of the transition metal, by a plasma nitriding, comprises forming, by the plasma nitriding, crystal structures of an $M_4N$ type and crystal structures of an $\epsilon$-$M_{2-3}N$ type, over a whole area of the surface of the base material and in a depth direction from the surface.

According to an aspect of the present invention, a method of manufacturing a separator for fuel cells comprises plasma nitriding a surface of a base material comprising a transition metal or an alloy of the transition metal, and forming, by the plasma nitriding, a nitrided layer having crystal structures of an $M_4N$ type and crystal structures of an $\epsilon$-$M_{2-3}N$ type, over a whole area of the surface and in a depth direction from the surface.

According to an aspect of the present invention, a fuel cell stack has a separator for fuel cells according to the present invention.

According to an aspect of the present invention, a fuel cell vehicle includes a fuel cell stack according to the present invention, as a power source.

BRIEF DESCRIPTION OF THE DRAWINGS

FIG. 3a is a schematic perspective view of a separator for fuel cells. FIG. 3b is a sectional view of the separator for fuel cells along line IIIb-IIIb. FIG. 3c is a sectional view of the separator for fuel cells along line IIIc-IIIc.

FIG. 4a is a schematic diagram of an $M_4N$ type crystal structure. FIG. 4b is a crystal structure of a hexagonal crystal of an $\epsilon$-$M_{2-3}N$ type.

FIG. 6a is a side view of an appearance of an electric automobile having mounted thereto a fuel cell stack according to an embodiment of the present invention. FIG. 6b is a top view of the electric automobile.

FIG. 7a is a schematic diagram for description of a method of measuring contact resistances of samples from embodiment examples. FIG. 7b is a schematic diagram for description of a device employed for the measurement of contact resistances.

FIG. 9a is a TEM photograph of a sample from an embodiment example 1. FIG. 9b is a macro photograph of a region 71b.

FIG. 16 is a sectional view of configuration of a unit cell forming a fuel cell stack.

BEST MODE FOR CARRYING OUT THE INVENTION

There will be described below into details a transition metal nitride, a separator for fuel cells, a fuel cell stack, a fuel cell vehicle, a method of manufacturing a transition metal nitride, and a method of manufacturing a separator for fuel cells according to embodiments of the present invention.

(Transition Metal Nitride, Separator for Fuel Cells, and Fuel Cell Stack)

Figure 1:
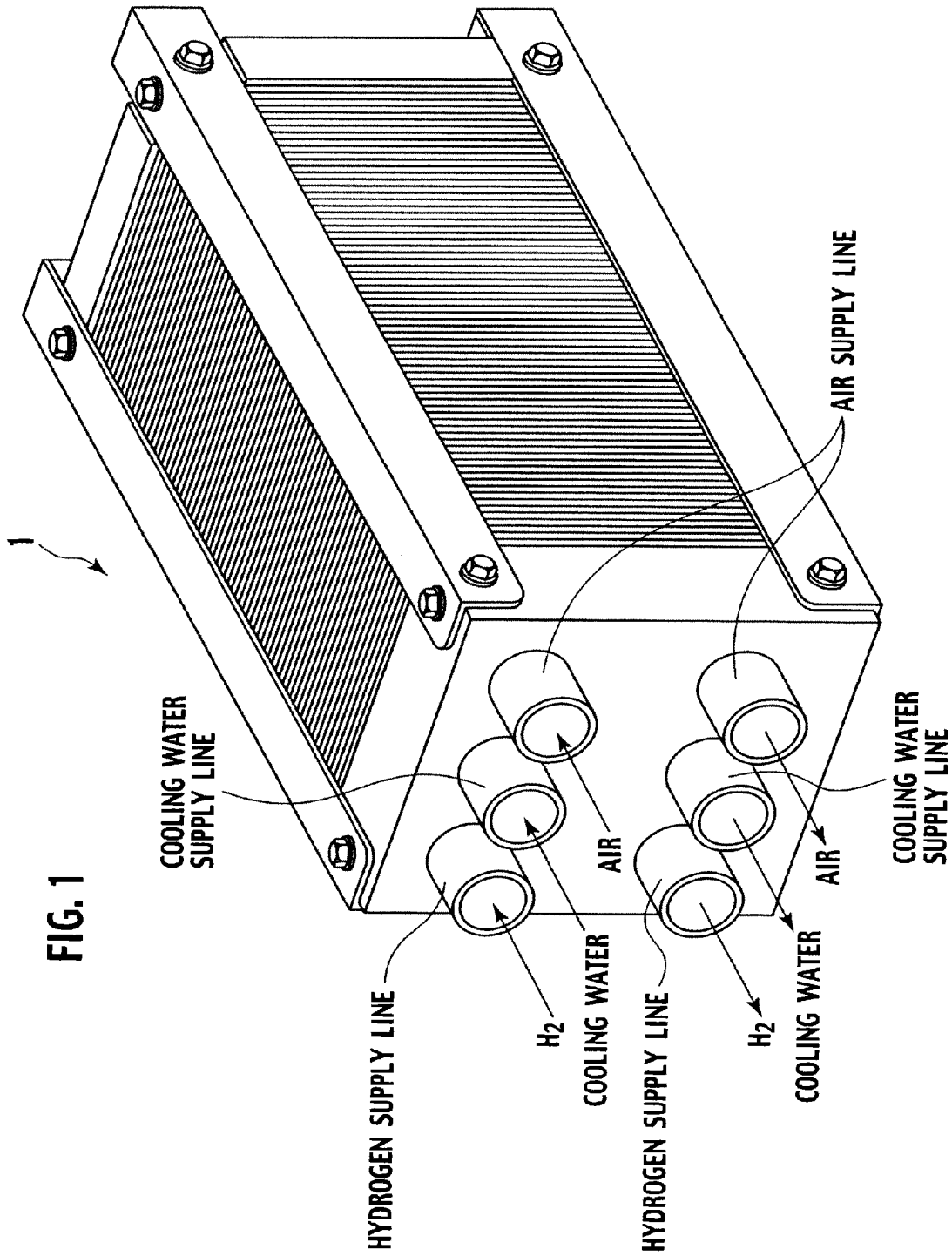
FIG. 1 is a perspective view of an appearance of a fuel cell stack configured with separators for fuel cells according to an embodiment of the present invention.
Figure 2:
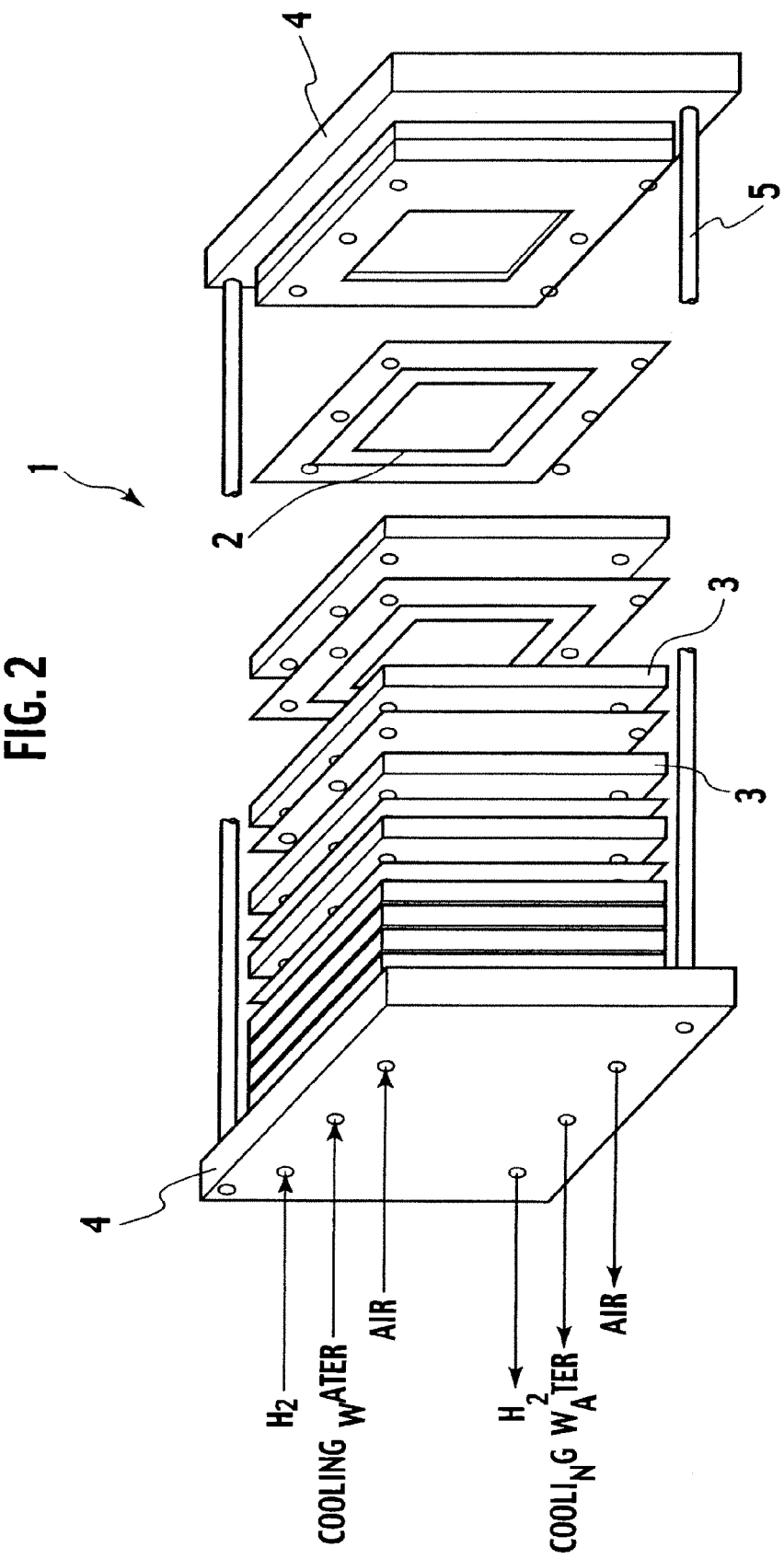
FIG. 2 is an exploded view of the fuel cell stack configured with separators for fuel cells according to the embodiment of the present invention.

FIG. 1 is a perspective view of an appearance of a fuel cell stack configured with separators for fuel cells according to an embodiment of the present invention. FIG. 2 is an exploded view of the fuel cell stack 1 schematically showing a detailed configuration of the fuel cell stack 1.

As shown in FIG. 2, the fuel cell stack 1 is configured as an alternating lamination of pluralities of membrane electrode assemblies 2 each serving as a fundamental unit for power generation by electrochemical reactions, and separators 3 for fuel cells. Each unit cell 2 is made up by a membrane electrode assembly 2, in which a gas diffusion layer that has an oxidizer electrode and another gas diffusion layer that has a fuel electrode are formed either on both sides of an electrolyte membrane of a solid polymer type, and separators 3 for fuel cells are arranged on both sides of the membrane electrode assembly 2, the separators 3 for fuel cells being each formed with oxidizer gas channels and fuel gas channels. As the solid polymer type electrolyte membrane, there may be employed a film of perfluorocarbon polymer having sulfonate group (Nafion 1128 (registered trade name) by Du Pont Co.), or the like. After unit cells and separators 3 for fuel cells are laminated, end flanges 4 are disposed at both ends, and the outer peripheral parts are fastened together by tie bolts 5, whereby the fuel cell stack 1 is assembled. Further, the fuel cell stack 1 is provided with a hydrogen supply line for supplying each unit cell with a fuel gas such as a hydrogen gas containing hydrogen, an air supply line for supplying air as an oxidizer gas, and a cooling water supply line for supplying cooling water.

FIG. 3 shows schematic views of a separator 3 for fuel cells shown in FIG. 2. FIG. 3($a$) is a schematic perspective view of the separator 3 for fuel cells, FIG. 3($b$), a sectional view of the separator 3 for fuel cells along line IIIb-IIIb, FIG. 3($c$), a sectional view of the separator 3 for fuel cells along line IIIc-IIIc. As illustrated in FIG. 3($a$), the separator 3 for fuel cells comprises a base material 10 comprising a transition metal or an alloy of the transition metal. It is obtained by a nitriding treatment of a surface 10$a$ of the base material 10, and composed of a nitrided layer 11 formed over an entirety of the surface 10$a$ of the base material 10 and continuously in a depth direction of the surface, and a base layer 12 as a non-nitrided layer that is not nitrided. The separator 3 for fuel cells has channel-like passages 13 formed therein for fuel and oxidizer, by a press forming, into rectangular shapes in section. Between a passage 13 and a passage 13, there is provided a flat planer part 14 defined by the passage 13 and the passage 13, where the nitrided layer 11 extends along outer surfaces of the flat planer part 14 and the passages 13. The flat planer part 14 is brought into contact with a gas diffusion layer on the solid polymer membrane, when unit cells 2 and separators 3 for fuel cells are alternately laminated. The nitrided layer 11 comprises a transition metal nitride that has crystal structures of an $M_4N$ type and crystal structures of an $\epsilon\text{-}M_{2\text{--}3}N$ type.

This transition metal nitride is obtained by a nitriding treatment of a base material of a transition metal or an alloy of the transition metal, and includes crystal structures of an $M_4N$ type and crystal structures of an $\epsilon\text{-}M_{2\text{--}3}N$ type, and hence has covalency-rich bonds formed between transition metal atoms and nitrogen atoms in the nitride, in addition to metallic bonds formed between metallic atoms, thus allowing for an excellent electric conductivity. Moreover, the nitride having an $M_4N$ crystal structure is chemically stable even in a strongly acidic atmosphere typically used in fuel cells, and has an excellent corrosion resistance. Still more, the chemical stability is increased by provision of a two-phase composite tissue including the $M_4N$ crystal structure and an $\epsilon\text{-}M_{2\text{--}3}N$ crystal structure. Therefore, the use of this transition metal nitride as a nitrided layer allows for a reduced contact resistance between a separator for fuel cells and a carbon paper, permitting the separator for fuel cells to exhibit a continuously favorable electric conductivity even in a strongly acidic atmosphere. Further, the contact resistance can be controlled without provision of a conventional gold film directly deposited on a surface to be contacted on an electrode, thus enabling implementation of a separator for fuel cells with a reduced cost.

The transition metal nitride may preferably be a complex tissue including a crystal layer comprising a matrix of crystal structures of $M_4N$ type and crystal structures of $\epsilon\text{-}M_{2\text{--}3}N$ type formed in the matrix, and have a laminate structure in which crystal structures of $M_4N$ type and crystal structures of $\epsilon\text{-}M_{2\text{--}3}N$ type are repeatedly laminated. The laminate structure thus has crystal structures of $\epsilon\text{-}M_{2\text{--}3}N$ type included in the matrix of crystal structures of $M_4N$ type, thereby permitting the nitrided layer to have a secured chemical stability.

The base material may preferably comprise a stainless steel containing transition metal atoms selected from among Fe (iron), Cr (chromium), Ni (nickel), and Mo (molybdenum). As stainless steels containing such elements, there are austenitic, austenitic-ferritic, and precipitation hardened stainless steels to be quoted.

The base material may preferably be made of one of them, in particular, of an austenitic stainless steel. As examples of austenitic stainless steel to be quoted, there are SUS304, SUS310S, SUS316L, SUS317J1, SUS317J2, SUS321, SUS329J1, SUS836, and the like. Among them, SUS310S and SUS317J2 have much Cr contents and favorable for use.

The base material 10 may preferably contain 18 wt % or more of Cr and 10 wt % or more of Ni. This case permits a stable provision of $M_4N$ crystal structure, allowing for an excellent conductivity and corrosion resistance. In addition, there is an excellent moldability due to an austenitic tissue, as an effect to be given. It is noted that more preferably the base material should contain 25 wt % or more of Cr. In this case, the ratio of Cr in $M_4N$ crystal structure is increased, affording to have an oxidation resistance at lower temperatures than Fe, allowing for a chemical stability under a fuel cell environment, with an excellent conductivity and corrosion resistance.

More specifically, the crystal structure of $M_4N$ type may preferably comprise a crystal structure having a nitrogen atom disposed in an octahedral void at a unit cell center of a face-centered cubic lattice formed by transition metal atoms selected from among Fe, Cr, Ni, and Mo. FIG. 4 shows a crystal structure of $M_4N$ type. As shown in FIG. 4, the $M_4N$ crystal structure 20 has a nitrogen atom 22 disposed in an octahedral void at a unit cell center of a face-centered cubic lattice formed by transition metal atoms 21 selected from among Fe, Cr, Ni, and Mo. In the crystal structure 20 of $M_4N$ type, M represents a transition metal atom 21 selected from among Fe, Cr, Ni, and Mo, and N represents a nitrogen atom 22. The nitrogen atom 22 occupies a ¼ of the octahedral void at the unit cell center of the $M_4N$ crystal structure 20. That is, the crystal structure 20 of $M_4N$ type is an interstitial solid solution having an interstitial nitrogen atom 22 in an octahedral void at a unit cell center of a face-centered cubic lattice of transition metal atoms 21, and the nitrogen atom 22 is located at a lattice coordinate (½, ½, ½) of each unit cell in representation by space lattice of cubical crystal. The provision of a $M_4N$ crystal structure allows for a strong covalent tendency between nitrogen atom 22 and transition metal atoms 21, with maintained metallic bonds between transition metal atoms 21.

In the $M_4N$ crystal structure 20, transition metal atoms 21 may preferably have Fe as a principal component, while Fe may be an alloy substituted in part with another transition metal atom such as Cr, Ni, or Mo. Further, it may be preferable for transition metal atoms 21 constituting crystal structures 20 of $M_4N$ type to be free of regularities. In this case, transition metal atoms have reduced partial molar free energy, so that their activities can be suppressed low. With this, transition metal atoms in the transition metal nitride have decreased reactivity, and the transition metal nitride has a chemical stability even under an acidic environment in the fuel cell. As a result, for a separator 3 for fuel cells in which such a transition metal nitride constitutes a nitrided layer 11, contact resistances between the separator 3 for fuel cells and electrodes such as carbon papers will be maintained low, with an enhanced durability. Moreover, as low contact resistances are maintainable without forming precious metal films on separators 3 providing contact surfaces to electrodes, there can be achieved a low cost. Further, it is preferable for transition metal atoms 21 to have mixing entropy increased due to no regularities, so that each transition metal atom has reduced partial molar free energy, or activity of each transition metal atom has a lower value than estimated from Raoult's law.

And, in the $M_4N$ crystal structure 20, if the atom ratio of Cr to Fe is high, nitrogen contained in the nitrided layer is bonded with Cr in the nitrided layer, thus having Cr nitrides such as CrN, i.e., nitrided chemical compounds of NaCl type, as principal components, with a reduced corrosion resistance of the nitrided layer. Therefore, preferably, transition metal atoms 21 should have Fe as a principal component. In this crystal structure, there being accompanied by, among others, highly dense shift conversions or bicrystals, the hardness also is as high as 1,000 HV or more, and it is considered as a nitride of an fcc or fct structure in which nitrogen is oversaturated as a solid solutie (Yasumaru, Kamachi; Journal of the Japan Institute of Metals, 50, pp 362-368, 1986). In addition, because of, among others, increased concentration of nitrogen as nearer to the surface, and CrN not being a main component, Cr to be effective for anti-corrosiveness is not reduced, affording to have a corrosion resistance held after nitriding, as well. Such being the case, for a transition metal nitride, the provision of a crystal structure of $M_4N$ type that has a nitrogen atom disposed in an octahedral void at a unit cell center of a face-centered cubic lattice formed by transition metal atoms selected from among Fe, Cr, Ni, and Mo, does render the corrosion resistance in a strongly acidic atmosphere within pH2 to pH3 the more excellent, and for a separator for fuel cells in which that transition metal nitride constitutes a nitrided layer, the contact resistance it has with a carbon paper can be suppressed low.

The nitrided layer may be given a lamination structure having crystal structures of $\epsilon\text{-}M_{2-3}N$ type included in a matrix of crystal structures of $M_4N$ type, for a chemical stability of nitrided layer to be secured. FIG. 4(b) shows a crystal structure 23 of $\epsilon\text{-}M_{2-3}N$ type. As shown in FIG. 4(b), the crystal structure 23 of $\epsilon\text{-}M_{2-3}N$ type is composed of transition metal atoms 24 and nitrogen atoms 25, with a higher nitrogen concentration than the crystal structure 20 of $M_4N$ type. Therefore, in comparison with a transition metal nitride of a single phase that simply has a $M_4N$ crystal structure 20, transition metal nitrides of a $\epsilon\text{-}M_{2-3}N$ crystal structure 23 have still greater nitrogen contents, and higher nitrogen atom concentrations in transition metal nitride. And, as the activity of each transition metal atom is reduced, the reactivity for oxidation of each transition metal atom in transition metal nitride is lowered. Thus, for a separator for fuel cells in which the transition metal nitride constitutes a nitrided layer, it is possible to obtain such a nitrided layer as chemically stable even under an acidic environment of fuel cell, and provided with a necessary conductivity as of a separator to be used for fuel cells, concurrently with a chemical stability as well as a corrosion resistance for the function of conductivity to be maintained under a working environment of fuel cell. Further, it becomes possible for transition metal atoms and nitrogen atoms in transition metal nitride to have an intensified covalent-bondability, so that the transition metal atoms have a reduced activity against oxidation, and become chemically stabilized, allowing for the more enhanced effects to maintain the function of conductivity, as well as on the corrosion resistance.

The transition metal nitride is a complex tissue including a matrix of crystal structures 20 of $M_4N$ type, and crystal structures of $\epsilon\text{-}M_{2-3}N$ type formed in the matrix, and the crystal structures of $\epsilon\text{-}M_{2-3}N$ type may preferably have inter-layer distances within a range of several tens to 100 nm. By provision of a complex tissue including a crystal structure of a $\epsilon\text{-}M_{2-3}N$ crystal structure in a matrix of $M_4N$ crystal structures, the transition metal nitride has a secured chemical stability. Further, for the transition metal nitride having inter-layer distances within a range of several tens to 100 nm, fine layer-like tissues of a nano-level have a two-phase equilibrium state, which reduces free energy, suppressing activities to be low, rendering the reactivity against oxidation low, affording to have a chemical stability. Therefore, oxidation is suppressed, allowing for an excellent corrosion resistance, in particular in a strongly acidic atmosphere.

For a separator for fuel cells having transition metal nitride as a nitrided layer, the ratio of nitrided layer to the thickness of base material may preferably be within 1/2000 to 1/10. More specifically, for a base material 10 of a plate thickness of 0.1 mm, the nitrided layer may preferably be formed in a base material surface 10a by a thickness within a thickness range of 0.05 μm to 10 μm. The separator for fuel cells having transition metal nitride as a nitrided layer is excellent in corrosion resistance in a strongly acidic atmosphere, and the contact resistance it has with a carbon paper can be suppressed low. It is noted that if the thickness of nitrided layer is smaller than 0.05 μm, it may suffer some cracks between nitrided layer and base material, or a poverty of adhesion strength between nitrided layer and base material that may lead in a long service to a tendency for the nitrided layer to peel with ease from an interfacial surface to the base material, thus constituting a difficulty to provide a sufficient corrosion resistance over a long time of service. Further, if the thickness of nitrided layer is greater than 10 μm, the stress in nitrided layer may go excessive, as the thickness of nitrided layer is increased, and the nitrided layer may suffer some cracks, with a tendency for the separator for fuel cells to suffer pitting corrosion, constituting a difficulty to contribute to enhancement of corrosion resistance.

The nitrided layer may preferably have a nitrogen amount of 5 at % or more and an oxygen amount of 50 at % or less in a most superficial layer down to a 5 nm depth from a most superficial surface of the base material. It is now noted that the most superficial surface indicates a single layer of atoms in an outermost part of the nitrided layer. If the coverage of sorbed oxygen molecules on a surface of transition metal gets high, clear bonds may be formed between transition metal atoms and oxygen atoms. This is oxidation of transition metal atom. Such oxidation on a transition metal surface is caused first by oxidation of an outermost first atomic layer. As oxidation of the first atomic layer is finished, then, sorbed oxygen on the first atomic layer receives free electrons from inside transition metal by a tunnel effect, and oxygen becomes a negative ion. And, a strong local electric field by such negative ions acts to pull out transition metal ions from inside transition metal, onto the surface, and pulled-out transition metal ions bond with oxygen atoms. That is, a second layer of oxidized film is produced. Such a reaction is caused one after another, making the oxidized film thicker. Such being the case, If the oxygen amount in nitrided layer is greater than 50 at %, an insulating oxidized film tends to be formed. To the contrary, if transition metal atoms make chemical compounds with nitrogen atoms in a condition where activities of transition metal atoms are suppressed to be further small with enhanced chemical potentials of nitrogen atoms in nitrided layer, then transition metal atoms have reduced free energy, allowing reactivity of transition metal atom against oxidation to be reduced, rendering transition metal atoms chemically stable. As a result, free electrons to be received by oxygen atoms are eliminated, and will not oxidize transition metal atoms, thus suppressing a growth of oxidized film. Like this, for the nitrided layer having on an electrode surface a nitrogen amount of 5 at % or more and an oxygen amount of 50 at % or less, it is possible to obtain a separator for fuel cells permitting a growth of oxidized film to be suppressed, allowing a contact resistance with a carbon paper to be suppressed low, achieving an excellent corrosion resistance in a strongly acidic atmosphere.

The nitrided layer may preferably have an O/N ratio of 10.0 or less for the oxygen amount to the nitrogen amount in the most superficial layer down to the 5 nm depth from the most superficial surface. In this case, it is allowed to meet the condition for the nitrogen amount to be 5 at % or more and the oxygen amount to be 50 at % or less, allowing a contact resistance with a carbon paper to be suppressed low, achieving an excellent corrosion resistance in a strongly acidic atmosphere. In failure to comply with this range, an oxide skin may be formed as a passive state on a surface of base material, resulting in an increased contact resistance, and a worsened electric conductivity.

Further, the nitrided layer may preferably have a nitrogen amount of 10 at % or more and an oxygen amount of 30 at % or less at a 10 nm depth from a most superficial surface of the base material. In this case, it is allowed for a contact resistance with a carbon paper to be suppressed low, achieving an excellent corrosion resistance in a strongly acidic atmosphere. It is noted that in failure to comply with this range, the contact resistance between separator and electrode becomes high, and the value of contact resistance per one of unit cells constituting a fuel cell stack exceeds 40 mΩ·cm², with a worsened performance of power generation, as a defect.

The nitrided layer may preferably comprise a transition metal nitride containing transition metals selected from among Fe, Cr, Ni, and Mo, having Fe as a principal component, and including a crystal layer comprising a matrix that has crystal structures of $M_4N$ type having a nitrogen atom disposed in a position in an octahedral void of a face-centered cubic lattice, and crystal structures of $\epsilon\text{-}M_{2-3}N$ type that have sizes of 10 nm to 30 nm and reside in the matrix, meeting formulas (3) to (6) below:

$$(Fe_{1-x-y-z}Cr_xNi_yMo_z)_4N_{1.1-1.7} \qquad (3)$$

$$0.19 \leq x \leq 0.28 \qquad (4)$$

$$0.11 \leq y \leq 0.20 \qquad (5)$$

$$0 \leq z \leq 0.01 \qquad (6)$$

Crystal structures of $\epsilon\text{-}M_{2-3}N$ type may well be finely dispersed in the matrix, and compounded. As described, a crystal structure of $\epsilon\text{-}M_{2-3}N$ type and a crystal structure of $M_4N$ type are shown in FIG. 4.

The transition metal nitride containing crystal structures 20 of $M_4N$ type holds metallic bonds between transition metal atoms, while exhibiting a strong covalent bondability between a nitrogen atom and transition metal atoms, and has oversaturatingly invading nitrogen atoms making bonds with transition metal atoms in positions in octahedral voids of face-centered cubic lattices formed by transition metal atoms, so that each metallic atom in the transition metal nitride has a reduced reactivity against oxidation. Moreover, according to the present invention, the transition metal nitride in which crystal structures of $M_4N$ type form a matrix, has crystal structures of $\epsilon\text{-}M_{2-3}N$ type having a yet higher nitrogen concentration, thus containing the more nitrogen in comparison with a single phase state simply having crystal structures of $M_4N$ type, so that nitrogen atoms in transition metal nitride have an enhanced activity. And, as each metallic atom has a yet reduced activity, the reactivity each transition metal atom in the transition metal nitride has against oxidation is reduced. Therefore, this transition metal nitride is chemically stable even under an acidic environment of fuel cell, allowing for a transition metal nitride to be provided with a necessary conductivity as of a separator to be used for fuel cells, concurrently with a chemical stability as well as a corrosion resistance for the function of conductivity to be maintained under a working environment of the separator. Further, it becomes possible for transition metal atoms and nitrogen atoms in transition metal nitride to have an intensified covalent-bond-ability, so that the transition metal atoms have a reduced activity against oxidation, and become chemically stabilized, allowing for the more enhanced effects to maintain the function of conductivity, as well as on the corrosion resistance. From this point of view, the transition metal nitride may preferably meet formulas (7) to (9) below:

$$0.26 \leq x \leq 0.28 \qquad (7)$$

$$0.13 \leq y \leq 0.19 \qquad (8)$$

$$0 \leq z \leq 0.01 \qquad (9)$$

Further, a binding energy of Fe-2p electron by an X-ray photoelectron spectroscopy of a newly-formed surface on the transition metal nitride as acid cleaned may preferably have a highest relative intensity at a chemical shift position of Fe—N. For the transition metal nitride as cleaned with a dilute sulfuric acid and several nm of oxide of the surface is thereby removed, bond energy of Cr-2p electron and Fe-2p electron is measured by an X-ray photoelectron spectroscopy (XPS), where the relative intensity becomes highest by a chemical shift in a state bonded with nitrogen atom together with Cr atom and Fe atom. That is, as for Cr bond in transition metal nitride, the bond between Cr atom and nitrogen atom is made strong, in comparison with the bond between Cr atom and oxygen atom and the bond between Cr atom and metallic atom. Further, as for bond of Fe atom, the bond between Fe atom and nitrogen atom is made strong, in comparison with the bond between Fe atom and oxygen atom and the bond between Fe atom and metallic atom. Like this, for the transition metal nitride according to the present invention, both Cr atom and Fe atom have a strongest bond with nitrogen atom. Thus, for the transition metal nitride according to the present invention, the reactivity each transition metal atom in the transition metal nitride has against oxidation is still reduced.

Crystal structures of $\epsilon$-$M_{2-3}N$ type may preferably have a thickness within 5 nm to 30 nm, and an inter-layer distance within several tens to 100 nm. Like this, in a matrix having crystal structures of $M_4N$ type, crystal structures of $\epsilon$-$M_{2-3}N$ type are dispersed, whereby complex compounds of $M_4N$ crystal structure and $\epsilon$-$M_{2-3}N$ crystal structures have an increased nitrogen atom content. The activity each transition metal atom in the transition metal nitride has against oxidation is thereby yet reduced. The separator for fuel cells having such a transition metal nitride as a nitrided layer is chemically stable even under such an acidic environment in fuel cell as described, and has a necessary conductivity as of a separator to be used for fuel cells, together with a chemical stability as well as a corrosion resistance for the function of conductivity to be maintained under a working environment of the separator. Moreover, the contact resistance it has with a carbon paper to be typically used as a fuel cell can be held low. Further, the contact resistance can be controlled without provision of a conventional gold film directly deposited on a surface to be contacted on an electrode, thus enabling implementation of a reduced cost. In addition, a fuel cell stack according to an embodiment of the present invention comprises a separator for fuel cells according to an embodiment of the present invention, allowing a high efficiency of power generation to be maintained without damages to the performance of power generation, enabling implementation of a reduced size with a reduced cost In view of the transition metal nitride to be formed on a stainless steel base material, with a stronger covalent bondability between transition metal atoms and nitrogen atoms, permitting the activity of each transition metal atom to be reduced, thereby reducing the reactivity the transition metal atom has against oxidation, allowing for a chemical stabilization to be achieved, as well as a maintained function of conductivity, the base material may preferably comprise a stainless steel containing transition metal elements selected from among Fe, Cr, Ni, and Mo, having Fe as a principal component, meeting formulas (10) to (12) below:

$$18 \text{ wt\%} \leq Cr \leq 26 \text{ wt\%} \tag{10}$$

$$11 \text{ wt\%} \leq Ni \leq 21 \text{ wt\%} \tag{11}$$

$$0 \text{ wt\%} \leq Mo \leq 2 \text{ wt\%} \tag{12}$$

Further, in view of the covalent bondability between transition metal atom and nitrogen atom to be strengthened, the base material may preferably meet formulas (13) to (15) below:

$$24 \text{ wt\%} \leq Cr \leq 26 \text{ wt\%} \tag{13}$$

$$14 \text{ wt\%} \leq Ni \leq 20 \text{ wt\%} \tag{14}$$

$$0 \text{ wt\%} \leq Mo \leq 1 \text{ wt\%} \tag{15}$$

(Method of Manufacturing a Transition Metal Nitride, and Method of Manufacturing a Separator for Fuel Cells)

Description is now made of embodiments of a method of manufacturing a transition metal nitride, and a method of manufacturing a separator for fuel cells according to the present invention. According to an aspect, a method of manufacturing a transition metal nitride to be formed on a surface of a base material comprising a transition metal or an alloy of the transition metal, by a plasma nitriding, comprises forming, by the plasma nitriding, crystal structures of an $M_4N$ type and crystal structures of an $\epsilon$-$M_{2-3}N$ type, over a whole area of the surface of the base material and in a depth direction from the surface. By this manufacturing method, there can be obtained with ease a transition metal nitride comprising crystal structures of an $M_4N$ type and crystal structures of an $\epsilon$-$M_{2-3}N$ type formed over a whole area of the surface of the base material and continuously in a depth direction from the surface. Further, according to an aspect, a method of manufacturing a separator for fuel cells comprises plasma nitriding a surface of a base material comprising a transition metal or an alloy of the transition metal, and forming, by the plasma nitriding, a nitrided layer having crystal structures of an $M_4N$ type and crystal structures of an $\epsilon$-$M_{2-3}N$ type, over a whole area of the surface and in a depth direction from the surface. By this manufacturing method, there can be obtained with ease a separator for fuel cells comprising a base material comprising a transition metal or an alloy of the transition metal, and a nitrided layer of a transition metal nitride formed in a depth direction from a surface of the base material.

Figure 5:
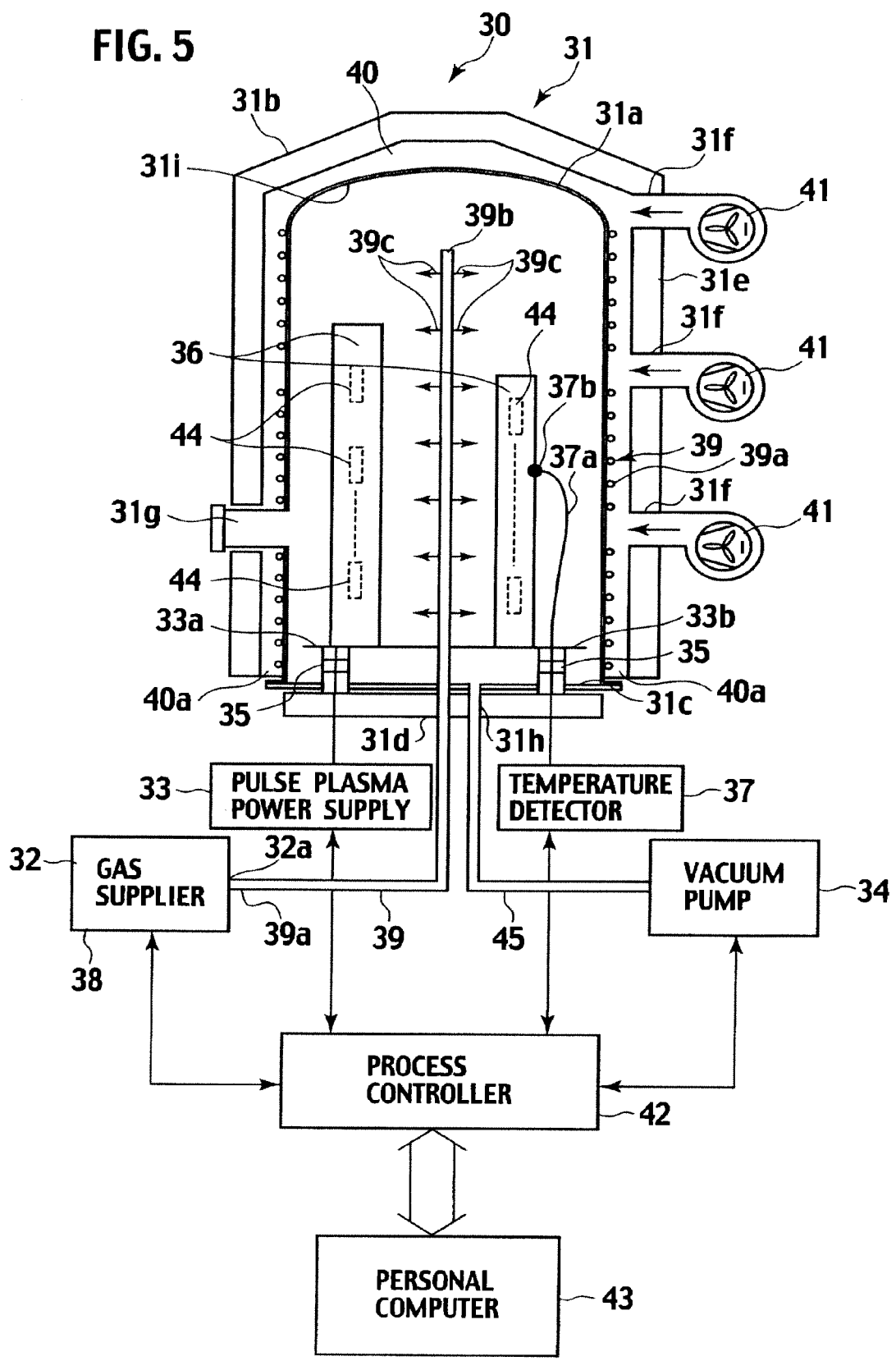
FIG. 5 is a schematic elevation of a nitriding apparatus employed in a method of manufacturing a separator for fuel cells according to an embodiment of the present invention.

The plasma nitriding is a method of having an object to be treated (now the base member) as a negative electrode, and imposing a direct-current voltage to generate a glow discharge, i.e., low-temperature nonequilibrium plasma for ionizing part of gas components, to bombard ionized gas components in the nonequilibrium plasma by high speeds onto a surface of the object to be treated, to thereby effect a nitriding. FIG. 5 is a schematic elevation of a nitriding apparatus 30 employed in a method of manufacturing a separator for fuel cells according to an embodiment of the present invention.

The nitriding apparatus 30 includes a batch type nitriding furnace 31, a vacuum pump 34 for evacuation of, to give a vacuum pressure to, a vacuum nitiridng shell 31a installed in the nitriding furnace 31, a gas supplier 32 for supplying an atmospheric gas to the vacuum nitiridng shell 31a, a combination of plasma electrodes 33a and 33b to be charged to a high voltage for generating plasma in the vacuum nitiridng shell 31a and a pulse plasma power supply 33 for supplying the electrodes 33a and 33b with a direct-current voltage pulsated to a high-frequency wave of a 45 kHz frequency, and a temperature detector 37 for detecting a temperature in the vacuum nitiridng shell 31a. The nitriding furnace 31 has an outer shell 31b made by a heat-insulating insulation material for accommodating the vacuum nitiridng shell 31a, and provided with a plasma observation port 31g with a vacuum heat-resisting glass. The vacuum nitiridng shell 31a has, at its bottom 31c, a system of insulators 35 for holding the plasma electrodes 33a and 33b at a high-voltage potential. Above the plasma electrodes 33a and 33b, there are installed support frames 36 made of a stainless steel. The support frames 36 have fuel or oxidizer channels formed therein by a press formation, and are configured to support thereon pieces of stainless steel foil (referred herein sometimes to "base members") machined in the form of a separator. The gas supplier 32 includes a gas chamber 38 and a gas supply line 39, the gas chamber 38 having a prescribed number of gas introducing open ports (not shown), which ports communicate with a hydrogen gas supply line (not shown), a nitrogen gas supply line (not shown), and an argon gas supply line (not shown) each respectively provided with a gas supply valve (not shown). The gas supplier 32 further has a gas supplying open port 32a communicating with one end 39a of the gas supply line 39, the port 32a being provided with a gas supply valve (not shown). The gas supply line 39 hermetically passes through a bottom 31d of the outer shell 31b as well as the bottom 31c of the vacuum nitridnig shell 31a of the nitriding furnace 31, and extends inside the vacuum nitridnig shell 31a, to finally constitute a riser 39b rising upright. The riser 39b has a plurality of openings 39c for discharging gases into the vacuum nitridnig shell 31a. The vacuum nitridnig shell 31a has an internal gas pressure thereof detected by a gas pressure sensor (not shown) provided at the bottom 31c of the vacuum nitridnig shell 31a. The vacuum nitridnig shell 31a has on an outer periphery thereof windings of electric conductors 39a of a resistance heating or induction heating heater 39, and is thereby heated. Between the vacuum nitridnig shell 31a and the outer shell 31b, there is defined an air flow path 40. The outer shell 31b has a side wall 31e, where air blowers 41 are provided for sending air to inflow into the air flow path 40 through openings 31f provided in the side wall 31e of the outer shell 31. The air flow path 40 has openings 40a, where air outflows. The vacuum pump 34 is adapted to effect evacuation through an evacuation line 45 communicating with an open port 31h in the bottom 31c of the vacuum nitriding shell 31a. The temperature detector 37 is connected to a temperature sensor 37b (e.g., thermocouple) via a signal line 37a extending through the bottoms 31c and 31d of vacuum nitriding shell 31a and outer shell 31b and the plasma electrodes 33a and 33b.

The pulse plasma power supply 33 receives a control signal from a process controller 42, whereby it is turned on and off. Each piece of stainless steel foil 44 has, relative to a grounded end (for example, an inner wall 31i of the vacuum nitriding shell 31a.), a potential difference corresponding to a voltage supplied from the pulse plasma power supply 33. Also the gas supplier 32, vacuum pump 34, temperature detector 37, and gas pressure sensor are controlled by the process controller 42, while the process controller 42 is operated by a personal computer 43.

Description is made into details of the plasma nitriding method employed in the embodiment of the present invention. First, as objects to be treated, pieces of stainless steel foil 44 are arranged in the vacuum nitriding shell 31a, of which an inside is evacuated to a vacuum of 1 Torr (=133 Pa) or less. Next, a mixed gas of hydrogen gas and argon gas is introduced in the vacuum nitriding shell 31a, and thereafter, at a degree of vacuum within several Torr to dozen or more Torr (665 Pa to 2,128 Pa), a voltage is applied between pieces of stainless steel foil 44 as negative electrodes and the inner wall 31i of vacuum nitriding shell 31 as a positive electrode. In this case, stainless steel foil 44 as a negative electrode has a glow discharge caused thereon, so that the stainless steel foil 44 is heated and nitrided by the glow discharge.

As of a method of manufacturing a separator to be used for fuel cells according to an embodiment of the present invention, as a first process, there is performed a spatter cleaning to remove a passive film of a surface of base material 44 composed of stainless steel foil. In the spatter cleaning, ionized introduced gases such as hydrogen ions and argon ions collide on a surface of base material 44, removing oxide films having, as a main component, Cr in the surface of base material 44.

As a second process, after the spatter cleaning, a mixed gas of hydrogen gas and nitrogen gas is introduced in the nitriding furnace 31, and a voltage is applied to have a glow discharge caused on the base material 44 being a negative electrode. In this occasion, ionized nitrogen collides on, invades, and diffuses in a surface of base material 44, whereby the surface of base material 44 has a continuous nitrided layer formed therein with crystal structures of $M_4N$ type and crystal structures of $\epsilon\text{-}M_{2-3}N$ type. Concurrently with formation of the nitrided layer, there is caused a reduction reaction in which ionized hydrogen reacts with oxygen in the surface of base material 44, whereby oxide films formed in the surface of base material 44 are removed.

It is noted that in this plasma nitriding method, the reaction on the surface of base material 44 is not any equilibrium reaction, but a nonequilibrium reaction, such that a transition metal nitride containing crystal structures of $M_4N$ type with high concentration of nitrogen and crystal structures of $\epsilon\text{-}M_{2-3}N$ type is quickly obtainable in a depth direction from the surface of base material 44, and this metal nitride abounds in electric conductivity and corrosion resistance.

To the contrary, those nitiriding methods in which nitridation proceeds as an equilibrium reaction under atmospheric pressure, such as a gas nitriding method, if applied, will suffer a difficulty to remove a passive film of base material surface, and because of the equilibrium reaction, need a long time to provide crystal structures of $M_4N$ type and crystal structures of $\epsilon\text{-}M_{2-3}N$ type in the base material surface, with a difficulty to obtain a desirable nitrogen concentration. Thus, with oxide films residing in the base material surface, the electric conductivity may be worsened, and chemical stability may be failed, so it may be difficult for a nitride or nitrided layer obtained by such a nitiriding method to have a maintained conductivity in a strongly acidic atmosphere.

It is preferable to use a pulse plasma power supply as a power supply in embodiments of the present invention. As a power supply to be used for a plasma nitriding method, typically used is a direct-current power supply, which applies a direct-current voltage, detects an associated discharge current by a current detector, and has a direct-current waveform controlled by a thyristor to provide a prescribed current. In this case, a glow discharge is continuously sustained, and when the temperature of a base material is measured by a radiation thermometer, the base material temperature is varied within a range of about ±30° C. Contrary thereto, the pulse plasma power supply is configured with a high-frequency cutoff circuit using a thyristor and a direct-current voltage, and by this circuit, the waveform of direct-current power supply is made as a pulsing waveform for the glow discharge to repeat turning on and off. In this case, such a pulse plasma power supply is employed that has a period of time for plasma discharge and a period of time for plasma interruption, set within 1 to 1,000 μsec, to repeat discharge and interruption for the plasma nitriding to be implemented, and when the temperature of a base material is measured by a radiation thermometer, the base material temperature is varied within a range of about ±5° C. To obtain a transition metal nitride with a high nitrogen concentration, a precise temperature control of base material temperature is necessary, and it is preferable to use a pulse plasma power supply adapted to repeat a discharge and an interruption of plasma by a period within 1 μsec to 1,000 μsec.

For a nitrided layer formed by this method in a base material surface, the contact resistance can be controlled without provision of a conventional gold film directly deposited on a surface to be contacted on an electrode, thus enabling implementation of a reduced cost.

Further, for plasma nitriding, the condition for treatment may preferably be such that temperature 400° C. to 500° C., treatment time min to 60 min, gas mixing ratio $N_2:H_2=1:5$ to 7:3, and treatment pressure 3 Torr to 7 Torr (=399 Pa to 931 Pa). As a failure for the nitriding condition to comply with the above-noted range, if the nitriding treatment is performed at a temperature under 400° C., it may result in a failed formation of nitrided layer. Further, at a temperature exceeding 500° C., formation of $M_4N$ crystal structures may be failed, with precipitation of high-temperature phase $Cr_2N$, CrN, etc. As a result, chemical potentials of nitrogen atom may be controlled unsuccessfully, failing to control the activity of each metallic element to be low. In addition, precipitation of $Cr_2N$, CrN may cause a formation of Cr voids in base layer, with a reduced corrosion resistance. If the treatment time is shorter than 1 min, it may result in a failed formation of nitrided layer. Further, if the treatment time exceeds 60 min, the manufacturing may be inflated. In addition, as a failure for the gas mixing ratio to comply with the above-noted range, if the proportion of nitrogen in the gas is decreased, it may result in a failed formation of nitrided layer. To the contrary, if the proportion of nitrogen is a 100%, as the amount of hydrogen acting as a reducing agent is decreased, it may result in an oxidized surface of base layer. Further, to obtain a nitrided layer containing $\epsilon\text{-}M_{2-3}N$ crystal structures, the treatment pressure may well be increased, or the N2 gas ratio may well be increased in gas ratio, as it is a preferable condition. Under such treatment condition, the plasma nitriding is allowed to form in a base material surface a nitrided layer containing $M_4N$ crystal structures and $\epsilon\text{-}M_{2-3}N$ crystal structures.

Like this, in accordance with a method of manufacturing a separator for fuel cells according to an embodiment of the present invention, a separator for fuel cells as well as a transition metal nitride can be manufactured by facilitated operations, with a maintained low contacting resistance under an oxidizing environment, an excellent corrosion resistance, and an implemented low cost.

(Fuel Cell Vehicle)

Description is now made of a fuel cell vehicle according to an embodiment of the present invention, as it is embodied in the form of a fuel cell electric automobile having as its power source a fuel cell stack according to an embodiment of the present invention as described.

FIG. 6 shows by a combination of views appearances of a fuel cell electric automobile in which a fuel cell stack 1 is mounted. FIG. 6(a) is a side view of the fuel cell electric automobile 500, and FIG. 6(b), a top view of the fuel cell electric automobile 500. As shown in FIG. 6(b), in front of a vehicle body 51, there is formed an engine compartment portion 52 having assembled and joined up, by welding, left and right front side members and hood ridges, and besides, a dash lower member interconnecting the left and right food ridges with the front side members inclusive. In the fuel cell electric automobile 50 shown in FIGS. 6(a) and (b), the fuel cell stack 1 is mounted in the engine compartment portion 52.

A fuel cell separator according to an embodiment of the present invention is applied to the fuel cell stack 1, which has a high efficiency of power generation and is mountable to a mobile vehicle such as an automobile, allowing for an improved fuel consumption of a fuel cell electric automobile. Further, the fuel cell stack may be small-sized and light-weighted to mount on a vehicle, thereby reducing the vehicle weight, allowing for a saved fuel consumption, and an extended long travel distance. Further, a compact fuel cell may be mounted as a power source such as on a mobile vehicle, thereby allowing a space in a passenger room to be wide utilized, allowing for an enhanced styling flexibility.

Although an electric automobile has been described as an example of fuel cell vehicle, the present invention is not restricted to a car vehicle such as an electric automobile, and is applicable also to an air carrier or other machinery requiring electric energy.

EMBODIMENT EXAMPLES

Description will be made of embodiment example 1 to embodiment example 9 of a separator for fuel cells according to an embodiment of the present invention, and of comparative example 1 to comparative example 3. For those embodiment examples, different raw materials were processed under different conditions to prepare samples for examination of efficacy of a separator for fuel cells according to the present invention, and the illustrative embodiment examples should not be construed restrictive.

<Preparation of Samples>

For embodiment example 1 to embodiment example 4 and comparative example 1 to comparative example 2, as a base material, there was employed a 0.1 mm thick vacuum annealed material having as a raw material a 100×100 mm, JIS standard SUS316L (18Cr-12Ni-2Mo-lowC) or SUS310S (25Cr-20Ni-lowC). The vacuum annealed material was degreased and cleaned, and thereafter, both sides of the vacuum annealed material were plasma nitrided. Conditions of the plasma nitridation were each varied within ranges of nitriding temperature 400° C. to 550° C., nitriding time 10 min to 60 min, gas mixing ratio $N_2:H_2=3:7$ to 7:3 when nitriding, treatment pressure 3 Torr to 7 Torr (=399 Pa to 665 Pa). For embodiment example 1 to embodiment example 4, a pulse plasma power supply was used as a power supply. For comparative example 2, a direct-current power supply was used. It is noted that for comparative example 1, the samples were not plasma nitrided. After formation of a nitrided layer, a 2V potential was applied for 5 minutes in a strongly acidic solution within pH 1 to pH4, thereby forming a passive film. For comparative example 1 to comparative example 2, no passive film was formed.

For embodiment example 5 to embodiment example 9 and comparative example 3, a 0.1 mm thick bright annealed material of SUS316L, SUS310S, or SUS317J2 to the JIS was formed by a press formation into a prescribed form, and thereafter, degreased and cleaned, and plasma nitrided on both sides. For comparative example 3, the bright annealed material was degreased and cleaned, and plasma nitrided on both sides, before forming by a press formation into a prescribed form. Conditions of the plasma nitridation were each controlled within ranges of nitriding temperature 420° C. to 470° C., nitriding time 60 min, gas mixing ratio $N_2:H_2=3:7$, treatment pressure 3 Torr to 7 Torr (=399 Pa to 665 Pa). For embodiment example 5 to embodiment example 9, a pulse plasma power supply was used as a power supply. For comparative example 3, a direct-current power supply was used.

Table 1 shows steel types used in embodiment example 1 to embodiment example 9 and comparative example 1 to comparative example 3, contents (wt %) and atomic percents (at %) of elements contained therein.

TABLE 1

| | | Contens (wt %) | | | | Atomic percents (at %) | | | |
|---|---|---|---|---|---|---|---|---|---|
| | Steel type | Fe | Cr | Ni | Mo | Fe | Cr | Ni | Mo |
| Emb Ex 1 | SUS316L | 68 | 18 | 12 | 2 | 68 | 19 | 11 | 1 |
| Emb Ex 2 | SUS310S | 55 | 25 | 20 | 0 | 55 | 27 | 19 | 0 |
| Emb Ex 3 | SUS310S | 55 | 25 | 20 | 0 | 55 | 27 | 19 | 0 |
| Emb Ex 4 | SUS310S | 55 | 25 | 20 | 0 | 55 | 27 | 19 | 0 |
| Comp Ex 1 | SUS310S | 55 | 25 | 20 | 0 | 55 | 27 | 19 | 0 |
| Comp Ex 2 | SUS310S | 55 | 25 | 20 | 0 | 55 | 27 | 19 | 0 |
| Emb Ex 5 | SUS310S | 55 | 25 | 20 | 0 | 55 | 27 | 19 | 0 |
| Emb Ex 6 | SUS310S | 55 | 25 | 20 | 0 | 55 | 27 | 19 | 0 |
| Emb Ex 7 | SUS317J2 | 60 | 25 | 14 | 1 | 30 | 27 | 13 | 0.6 |
| Emb Ex 8 | SUS316L | 68 | 18 | 12 | 2 | 68 | 19 | 11 | 1 |
| Emb Ex 9 | SUS316L | 68 | 18 | 12 | 2 | 68 | 19 | 11 | 1 |
| Comp Ex 3 | SUS304 | 74 | 18 | 8 | 0 | 74 | 18 | 8 | 0 |

Table 2 shows whether nitrided or not, used plasma power supply, base material temperature when nitriding, nitriding time, gas mixing ratio, and treatment pressure.

TABLE 2

| | Nitrided | Plasma power supply | Base material temperature ° C. | Nitiriding time min | Gas mixing ratio $N_2:H_2$ | Pressure Torr |
|---|---|---|---|---|---|---|
| Emb Ex 1 | Yes | Pulse | 500 | 30 | 5:5 | 3 |
| Emb Ex 2 | Yes | Pulse | 500 | 30 | 5:5 | 3 |
| Emb Ex 3 | Yes | Pulse | 450 | 60 | 7:3 | 5 |
| Emb Ex 4 | Yes | Pulse | 400 | 60 | 3:7 | 7 |
| Comp Ex 1 | No | — | — | — | — | — |
| Comp Ex 2 | Yes | Direct current | 550 | 10 | 5:5 | 3 |
| Emb Ex 5 | Yes | Pulse | 420 | 60 | 7:3 | 4 |
| Emb Ex 6 | Yes | Pulse | 450 | 60 | 7:3 | 4 |
| Emb Ex 7 | Yes | Pulse | 420 | 60 | 7:3 | 4 |
| Emb Ex 8 | Yes | Pulse | 420 | 60 | 7:3 | 4 |
| Emb Ex 9 | Yes | Pulse | 435 | 60 | 7:3 | 4 |
| Comp Ex 3 | Yes | Direct current | 380 | 60 | 7:3 | 4 |

Samples were evaluated by the following methods.

<Identification of Nitrided Layer>

For identification of nitrided layers of samples obtained by the above-noted methods, an X-ray diffraction measurement of a surface treated for nitridation was made to thereby identify. For the apparatus, a Mac Science Co. make X-ray diffraction apparatus was employed. For the measurement, conditions were radiation source to be a CuKα beam, diffraction angle within 200 to 100°, and scan speed 2°/min.

<Observation of Nitrided Layer>

A cut plane of sample was polished, corroded by using royal water and glycerin corrosive liquid, and observed by a scanning electron microscope and a transmission electron microscope.

<Measurement of Thickness of Nitrided Layer>

Thickness of nitrided layer was measured by a section observation using an optical microscope or scanning electron microscope.

<Measurement of Nitrogen Amount and Oxygen Amount in Most Superficial Layer of Nitrided Layer>

A measurement of nitrogen amount and oxygen amount in most superficial layer of nitrided layer was made by a depth profile measurement of Auger electron spectroscopy for nitrogen amount and oxygen amount in a most superficial layer of a nitrided layer, that is, within a range down to a 5 nm depth from a surface of the nitrided layer. For the measurement, a scanning Auger electron spectroscopy analyzer (PHI Co. make model 4300) was used under conditions of electron beam acceleration voltage 5 kV, measurement region 20 μm×16 μm, ion gun acceleration voltage 3 kV, and spattering rate 10 nm/min (converted to $SiO_2$).

<Quantitative Determination of Nitrogen Amount>

For a nitrogen amount of a nitrided layer, that is, letting $M_4N_x$ be a chemical formula of the nitrided layer, for the value of X, an average was taken of measured values between depth 100 to 200 [m] by a depth profile of Auger electron spectroscopy. For the apparatus, PHI Co. make model 4300 was employed. The measurement was made under condition of electron beam acceleration voltage 5 kV, measurement region 20 μm×16 μm, ion gun acceleration voltage 3 kV, and spattering rate 10 nm/min (converted to $SiO_2$).

<Measurement of Chemical Bond Conditions>

For embodiment example 5 to embodiment example 9 and comparative example 3, chemical bond conditions were measured. For chemical bond conditions of Cr and Fe in nitrided layer, a nitrided stainless steel sheet was acid washed for two hours in a pH4 sulfuric acid aqueous solution, dissolving natural oxides in several nm of surface of a nitrided layer of the stainless steel sheet, developing a nitrided fresh surface for XPS spectra to be taken thereon. For the apparatus, PHI Co. make X-ray electron spectroscopy analyzer ESCA-5800 was employed. For the measurement, sample was irradiated by X-ray, using as radiation source Monochromated-Al-kα beam (voltage 1486.6 eV, 300 W), photoelectron ejection angle 75°, measurement depth about 5 μm, and measurement area ϕ 800 μm, oval.

<Measurement of Contact Resistance Value>

A sample obtained was cut in a size of 30 mm×30 mm for measurement of contact resistance. For the apparatus, Ulvac-Riko make pressure load contact electrical resistance measurement device model TRS-2000 was employed. And, as shown in FIG. 7(a), a carbon paper 63 was put between electrode 61 and sample 62, and as shown in FIG. 7(b), a set was arranged such that electrode 61a/carbon paper 63a/sample 62/carbon paper 63b/electrode 61b. Then, the electric resistance was measured twice by conducting a current of 1 A/cm2 under a measurement surface pressure 1.0 MPa, and an average of electric resistances was determined as a contact resistance value. For the carbon paper, employed was a carbon paper coated with platinum catalyst supported by carbon black (Toray (Inc.) make carbon paper TGP-H-090, thickness 0.26 mm, bulk density 0.49 g/cm³, porosity 73%, thickness-directional volume resistivity 0.07 Ω·cm²). For the electrodes, employed was a Cu electrode of diameter ϕ 20, and measurement was made two times, before and after a later-described corrosion resistance test.

Corrosion Resistance Test 1

Embodiment Example 1 to Embodiment Example 4 and Comparative Example 1 to Comparative Example 2

Fuel cell has a potential of about 1V vs SHE at maximum developed on the oxygen electrode side relative to the hydrogen electrode side. Further, the solid polymer electrolyte membrane makes use of a proton conductivity that the polymer electrolyte membrane, which has proton-exchange groups such as sulfonate groups in the molecule, exhibits when saturatedly moisturized, and has a strong acidity. Therefore, for estimation of corrosion resistances in embodiment example 1 to embodiment example 4 and comparative example 1 to comparative example 2, using a controlled-potential electrolysis test as an electrochemical measure, a prescribed constant potential was applied, and after this state was held for a constant time, the amount of metallic ions having eluted till then in a solution was measured by an X-ray fluorescence spectroscopy, and from the value of metallic ion elution amount, the degree of reduction of corrosion resistance was evaluated.

More specifically, first, a central portion of each sample was cut out in a size of 30 mm×30 mm, thereby preparing a sample, and the prepared sample was held in a sulfuric acid aqueous solution of pH2, at a temperature of 80° C. and a potential of 1 V vs SHE, for 100 hours. Thereafter, elution amounts of Fe, Cr, and Ni ions having eluted in the sulfuric acid aqueous solution were measured by the X-ray fluorescence spectroscopy.

Corrosion Resistance Test 2

Embodiment Example 5 to Embodiment Example 9 and Comparative Example 3

For embodiment example 5 to embodiment example 9 and comparative example 3, as a sever test to corrosion resistance increase, a dip test was performed. In fuel cells, the separator is kept away from electrodes by carbon papers used as gas diffusion layers, and even when humidifying water is condensed, droplets then condensed may be isolated from electrodes. Further, for humidifying water residing in a vicinity of separator or in a part thereof contacting with a carbon paper, the concentration of electrolyte is lean, and the ion conductivity is very small. In this case, electrons can move in the separator or carbon paper as an electron conductive medium, but due to the ion conductivity to be very small, ions are unable to move through humidifying water from a vicinity of separator to electrode catalyst. It therefore is difficult to consider the combination of separator portion and electrode catalyst portion as a single electrochemical cell. In this case, separator's potential may be considered in no way as an electrode potential, but as a natural potential. For reproduction of such a fuel cell environment, the inventors did not applied any potential to separator material, but performed a dip test dipping a sample in an acidic solution, thus performing a test under a severer condition in respect of contact resistance increase, than the controlled-potential electrolysis test, whereby they found that test be a more adapted test for evaluation of corrosion resistance. Therefore, avoiding applying a potential to a separator material, they put the separator material in a solution, and held it there for a constant interval of time, and thereafter, an increase in contact resistance was measured, to thereby evaluate a function maintainability of contact resistance, that is, chemical stability of nitride. It is noted that as conditions of the dip test (acid washing), the sample was dipped in a sulfuric acid aqueous solution of pH4, and for a temperature of 80° C., the constant period of time for holding was set to 100 hours. The contact resistance value after dip test is an evaluation of corrosion resistance under an oxidizing environment, simulating an environment a fuel cell separator is to be exposed in a fuel cell stack.

<Results>

For embodiment example 1 to embodiment example 9 and comparative example 1 to comparative example 3, Table 3 shows atomic percent of Cr to Fe in base layer.

TABLE 3

|  | Base layer at % Cr/at % Fe |
|---|---|
| Emb Ex 1 | 0.45 |
| Emb Ex 2 | 0.45 |
| Emb Ex 3 | 0.45 |
| Emb Ex 4 | 0.27 |
| Comp Ex 1 | 0.27 |
| Comp Ex 2 | 0.45 |
| Emb Ex 5 | 0.49 |
| Emb Ex 6 | 0.49 |
| Emb Ex 7 | 0.90 |
| Emb Ex 8 | 0.28 |
| Emb Ex 9 | 0.28 |
| Comp Ex 3 | 0.24 |

For embodiment example 1 to embodiment example 9 and comparative example 1 to comparative example 3, Table 4 shows crystal structure of nitrided layer, thickness of nitrided layer, thickness of $\epsilon$-$M_{2-3}$N crystal structure, and interlayer distance between an $\epsilon$-$M_{2-3}$N crystal structure and a neighboring $\epsilon$-$M_{2-3}$N crystal structure.

TABLE 4

|  | Nitrided layer crystal structure | Nitrided layer thickness μm | $\epsilon$ – $M_{2-3}$ N crystal structure nm | interlayer distance nm |
|---|---|---|---|---|
| Emb Ex 1 | $M_4$N + $\epsilon$ layered structure | 2.9 | layered/10~30 | 50~100 |
| Emb Ex 2 | $M_4$N + $\epsilon$ layered structure | 3.1 | layered/10~30 | 50~100 |
| Emb Ex 3 | $M_4$N + $\epsilon$ layered structure | 3.7 | layered/10~30 | 30~100 |
| Emb Ex 4 | $M_4$N + $\epsilon$ layered structure | 2.1 | layered/10~30 | 10~100 |
| Comp Ex 1 | γ | 0 | — | — |
| Comp Ex 2 | CrN | 2.8 | — | — |
| Emb Ex 5 | $M_4$N + $\epsilon$ layered structure | 2.5 | layered/10~30 | 50~100 |
| Emb Ex 6 | $M_4$N + $\epsilon$ layered structure | 3.1 | layered/10~30 | 80~120 |
| Emb Ex 7 | $M_4$N + $\epsilon$ layered structure | 3.5 | layered/10~30 | 50~100 |
| Emb Ex 8 | $M_4$N + $\epsilon$ layered structure | 4.5 | layered/5~20 | 150~200 |
| Emb Ex 9 | $M_4$N + $\epsilon$ layered structure | 5.0 | granular/10~20 | 50~200 |
| Comp Ex 3 | $M_4$N | 0.8 | — | — |

For embodiment example 1 to embodiment example 4 and comparative example 1 to comparative example 2, Table 5 shows thickness of oxidized layer in most surficial layer, oxygen amount and nitrogen amount, and ion elution amount in corrosion resistance test.

TABLE 5

|  | Oxide thickness nm | Oxygen amount at % | Nitrogen amount at % | Ion elution amount (ppm) | | |
|---|---|---|---|---|---|---|
|  |  |  |  | Fe | Cr | Ni |
| Emb Ex 1 | 5 | 20 | 40 | 0.6 | 0.1 | 0.15 |
| Emb Ex 2 | 5 | 20 | 30 | 0.8 | 0.12 | 0.16 |
| Emb Ex 3 | 3 | 20 | 35 | 1.2 | 0.2 | 0.14 |
| Emb Ex 4 | 2 | 20 | 40 | 0.5 | 0.08 | 0.13 |
| Comp Ex 1 | 50 | 60 | 0 | 5.4 | 1.2 | 1 |
| Comp Ex 2 | 5 | 20 | 30 | 15.4 | 2.3 | 3.5 |

For embodiment example 1 to embodiment example 4 and comparative example 1 to comparative example 2, Table 6 shows contact resistance values before corrosion resistance test and after corrosion resistance test.

TABLE 6

|  | Contact resistance value (mΩ · cm$^2$) | |
|---|---|---|
|  | Before corrosion resistance test | After corrosion resistance test |
| Emb Ex 1 | 7 | 8 |
| Emb Ex 2 | 8 | 10 |
| Emb Ex 3 | 7 | 9 |
| Emb Ex 4 | 7 | 7 |
| Comp Ex 1 | 765 | 765 |
| Comp Ex 2 | 30 | 70 |

For embodiment example 1 to embodiment example 9 and comparative example 1 to comparative example 3, Table 7 shows a chemical shift showing a maximal intensity, and the number X in $M_4N_x$.

TABLE 7

|  | Chemical shift max. intensity | x | y | z | $M_4N_x$ x |
|---|---|---|---|---|---|
| Emb Ex 5 | Fe—N | 0.28 | 0.2 | 0 | 1.7 |
| Emb Ex 6 | Fe—N | 0.26 | 0.2 | 0 | 1.3 |
| Emb Ex 7 | Fe—N | 0.25 | 0.13 | 0.006 | 1.3 |
| Emb Ex 8 | Fe—O | 0.19 | 0.11 | 0.01 | 1.3 |
| Emb Ex 9 | Fe—O | 0.19 | 0.11 | 0.01 | 1.1 |
| Comp Ex 3 | Fe—O | 0.18 | 0.08 | 0 | 0.9 |

For embodiment example 5 to embodiment example 9 and comparative example 3, Table 8 shows contact resistance values before corrosion resistance test and after corrosion resistance test.

TABLE 8

|  | Contact resistance value (mΩ · cm$^2$) | |
|---|---|---|
|  | Before corrosion resistance test | After corrosion resistance test |
| Emb. Ex 5 | 9 | 20 |
| Emb Ex 6 | 10 | 29 |
| Emb Ex 7 | 10 | 35 |
| Emb Ex 8 | 14 | 42 |
| Emb Ex 9 | 16 | 50 |
| Comp Ex 3 | 11 | 200 |

As shown in Table 4, sample of comparative example 1 was in such a condition that the base layer had no nitrided layer formed thereon, and a passive film was formed. Therefore, the elution amount of metallic ions was low as shown in Table 5, but the contact resistance values before corrosion resistance test and after corrosion resistance test were as high as 765 mΩ·cm$^2$ as shown in Table 6. Further, in sample of comparative example 2, the base layer had a nitrided layer formed thereon as shown in Table 4, while as shown in Table 2, the nitriding temperature was as high as 550° C., and a CrN of a halite crystal structure was formed, without formation of $M_4N$ crystal structure. As shown in Table 5, the electrolysis test resulted in much elution of ion with a reduced corrosion resistance for comparative example 2, and as shown in Table 6, the contact resistance values before corrosion resistance test was a low value, but the contact resistance values after corrosion resistance test was high, and the nitrided layer failed to exhibit a sufficient electrochemical stability under an oxidizing environment. This is considered because Cr as a corrosion resistance enhancing element contained in stainless steel has condensed in nitrided layer, causing Cr concentration of an interfacial surface between base layer and nitrided layer to decrease, reducing corrosion resistance of base layer.

Figure 8:
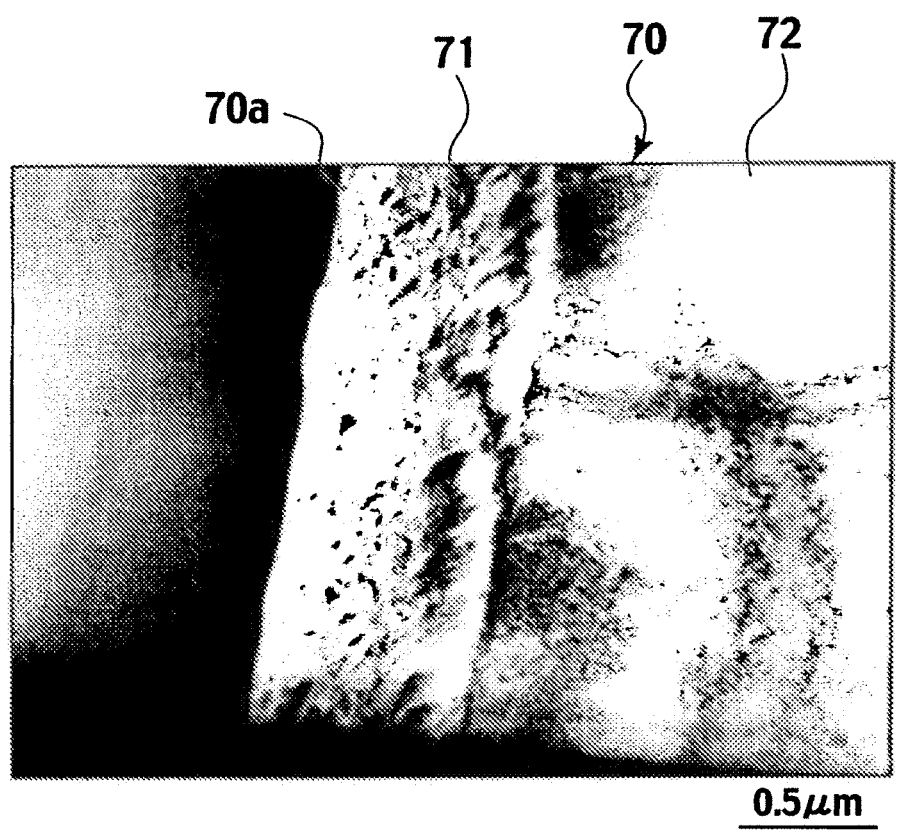
FIG. 8 is a TEM photograph of a sample from a comparative example 3.
Figure 10:
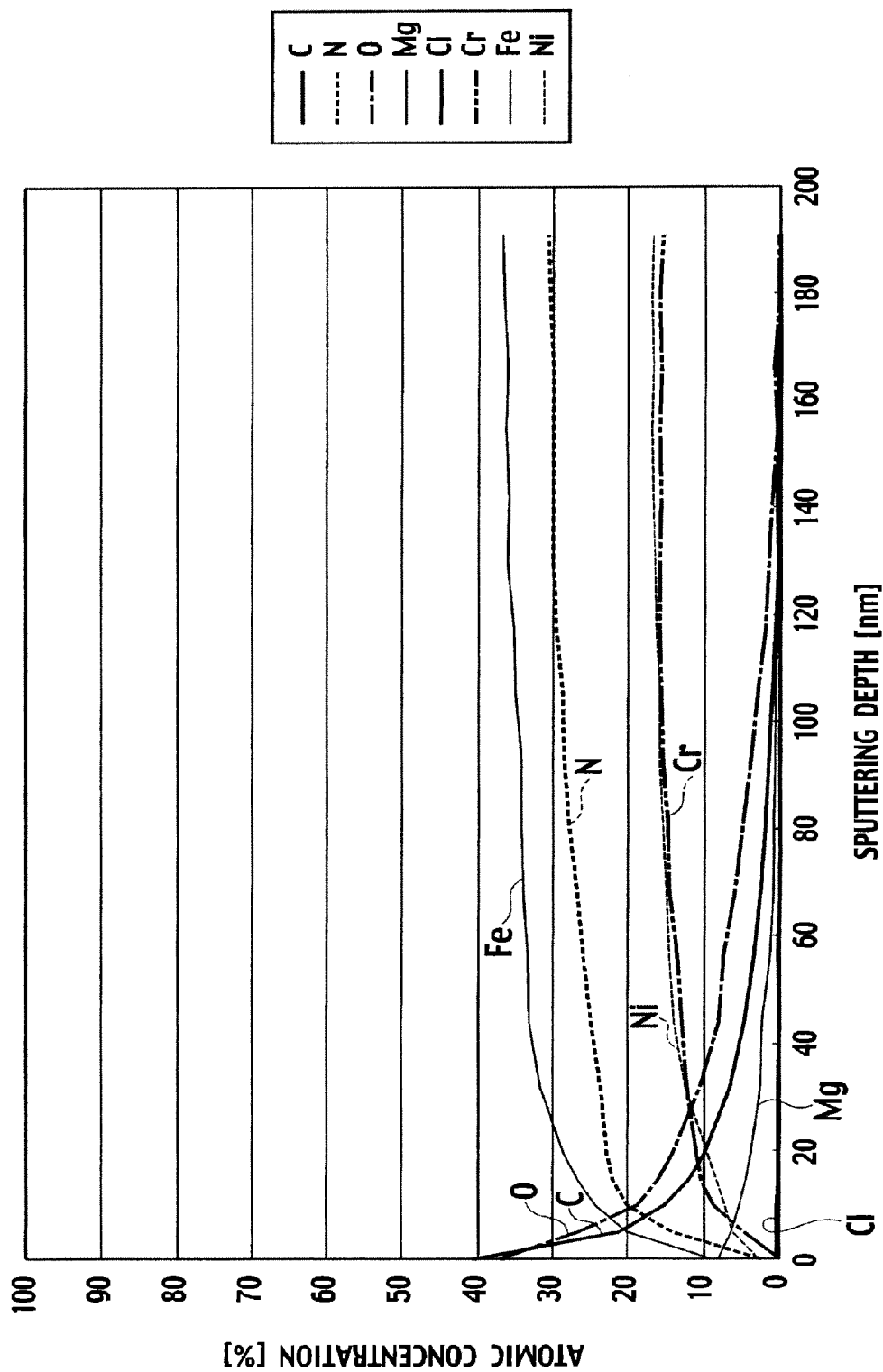
FIG. 10 is a graph showing element profiles by an Auger electron spectroscopy in a depth direction of the sample from the embodiment example 1.

For samples of embodiment example 1 to embodiment example 4, as shown in Table 4, a nitrided layer was formed with a layered structure containing $M_4N$ crystal structures and layered $\epsilon$-$M_{2-3}N$ crystal structures. FIG. 8 shows a TEM photograph of 30,000 magnifications of a sample obtained in comparative example 3, FIG. 9(a) shows a TEM photograph of 30,000 magnifications of a sample obtained in comparative example 1, and FIG. 9(b) shows a photomacrograph (150,000 magnifications) of a part 71b shown in FIG. 9(a). As shown in FIG. 8, by nitriding a surface 70a of a stainless steel 70 used as a base material, a nitrided layer 71 was formed in a depth direction of the surface 70a of base material 70, leaving a base layer 72 just below the nitrided layer 71 as a non-nitrided layer that was not nitrided. For comparative example 3, a nitrided layer 71 had $M_4N$ crystal structures. Contrary thereto, in embodiment example 1, as shown in FIG. 9, there was observed in an nitrided layer 71b a two-phase complex tissue in which layered tissues were repeated, which was turned up as a crystal layer composed of a matrix 73 of $M_4N$ crystal structures looking white in the figure, and layered $\epsilon$-$M_{2-3}N$ crystal structures 74 formed in the matrix 73 and looking black in the figure. Thickness of $\epsilon$-$M_{2-3}N$ crystal structure 74 was within 10 nm to 30 nm, and interlayer distance between $\epsilon$-$M_{2-3}N$ crystal structure 74 and $\epsilon$-$M_{2-3}N$ crystal structure 74 was within a range of nm to 100 nm. As a result of analysis of scanning Auger electron spectroscopy shown in FIG. 10, it has been turned up that the nitrided layer 71b had Fe as a principal component. Likewise, also in embodiment examples 2 to 4, thickness of $\epsilon$-$M_{2-3}N$ crystal structure was within a range of 10 nm to 30 nm, and interlayer distance between $\epsilon$-$M_{2-3}N$ crystal structure and $\epsilon$-$M_{2-3}N$ crystal structure was within a range of 30 nm to 100 nm.

Such being the case, for embodiment example 1 to embodiment example 4, $M_4N$ crystal structures and $\epsilon$-$M_{2-3}N$ crystal structures were formed, and contact resistance values before and after corrosion resistance test of each sample of embodiment example 1 to embodiment example 4 were each indicated as 10 mΩ·cm², so the corrosion resistance was little changed between before and after corrosion resistance test. Further, for ion elution amount, any sample indicated a lower value than embodiment example 1, proving a good corrosion resistance. Like this, each sample of embodiment example 1 to embodiment example 4 was excellent in electrochemical stability under oxidizing environment, and had a good corrosion resistance, which is because of a nitrided layer having $M_4N$ crystal structures, holding metallic bond between transition metal atoms, allowing for strong covalent bondability between nitrogen atom and transition metal atoms. In addition, it is considered because transition metal atoms constituting face-centered cubic lattice are irregularly mixed, thereby causing partial molar free energy of each transition metal atom to be reduced, allowing for a suppressed low activity. Further, layered $\epsilon\text{-}M_{2\text{-}3}N$ crystal structures were provided, and layered nano-level fine tissues had a state of two-phase equilibrium, permitting free energy to be reduced, thus allowing for a suppressed low activity, with a reduced reactivity against oxidation, and a chemical stability. It is thus considered that oxidation was suppressed to be excellent in corrosion resistance, in particular in a strongly acidic atmosphere. Further, thin oxide films of several tens nano-level were formed in a most superficial layer, thus allowing for an enhanced corrosion resistance without worsening conductivity.

Figure 11:
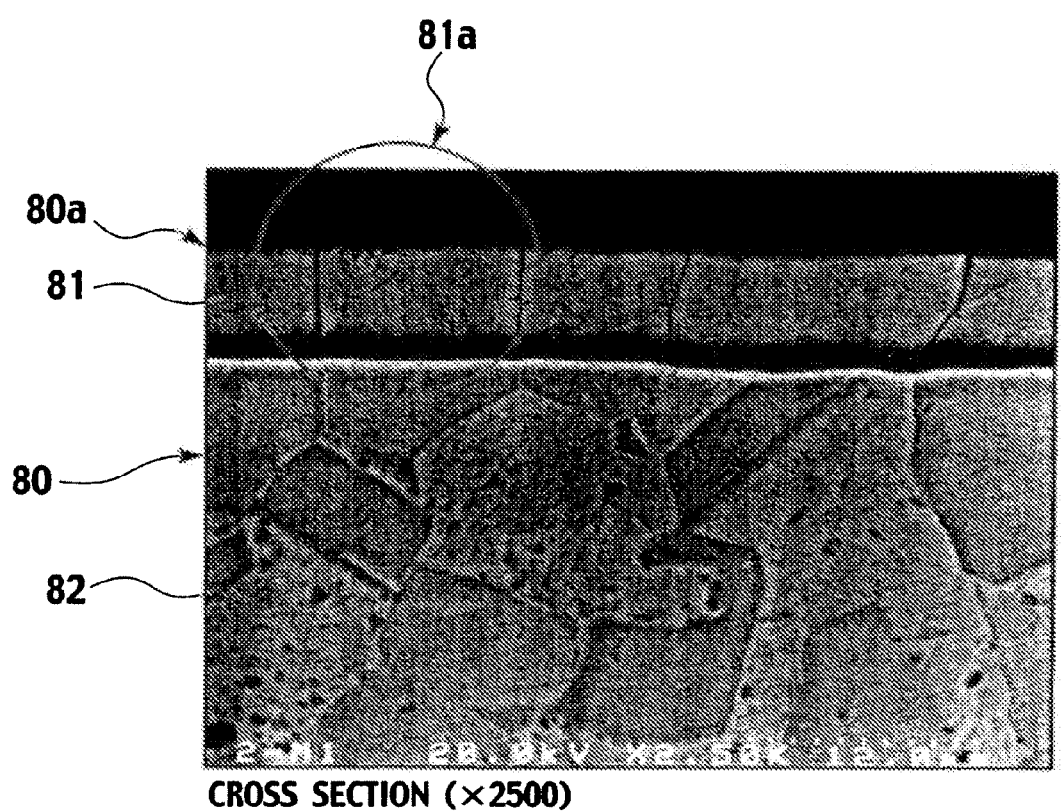
FIG. 11 is an SEM photograph of a sample from an embodiment example 5.

For embodiment example 5 to embodiment example 9, as shown in Table 4, a nitrided layer was formed with a layered structure containing $M_4N$ crystal structures and layered $\epsilon\text{-}M_{2\text{-}3}N$ crystal structures. Among them, for embodiment example 5 to embodiment example 8, $\epsilon\text{-}M_{2\text{-}3}N$ crystal structures were layeredly formed in a matrix containing $M_4N$ crystal structures. FIG. 11 shows an SEM photograph of 2,500 magnifications of a sample obtained in embodiment example 5. As shown in FIG. 11, by nitriding a surface 80a of a stainless steel used as a base material, a nitrided layer 81 was formed in a depth direction of the surface 80a of base material 80, leaving a base layer 82 just below the nitrided layer 81 as a non-nitrided layer that was not nitrided. Like FIG. 9, there was observed in an nitrided layer 81 a two-phase complex tissue in which layered tissues were repeated, which was turned up as a crystal layer composed of a matrix of $M_4N$ crystal structures, and layered $\epsilon\text{-}M_{2\text{-}3}N$ crystal structures formed in the matrix. Thickness of $\epsilon\text{-}M_{2\text{-}3}N$ crystal structure was within 10 nm to 30 nm, and interlayer distance between $\epsilon\text{-}M_{2\text{-}3}N$ crystal structure and $\epsilon\text{-}M_{2\text{-}3}N$ crystal structure was within a range of 50 nm to 100 nm. For other embodiment examples 6 to 8, thickness of $\epsilon\text{-}M_{2\text{-}3}N$ crystal structure was within 5 nm to 30 nm, and interlayer distance between $\epsilon\text{-}M_{2\text{-}3}N$ crystal structures was within 50 nm to 200 nm. For embodiment example 9, $\epsilon\text{-}M_{2\text{-}3}N$ crystal structures were granularly formed in a matrix of $M_4N$ crystal structures, thickness of $\epsilon\text{-}M_{2\text{-}3}N$ crystal structures was within 10 nm to 20 nm, and interlayer distance thereof was within a range of 50 nm to 200 nm.

Figure 12:
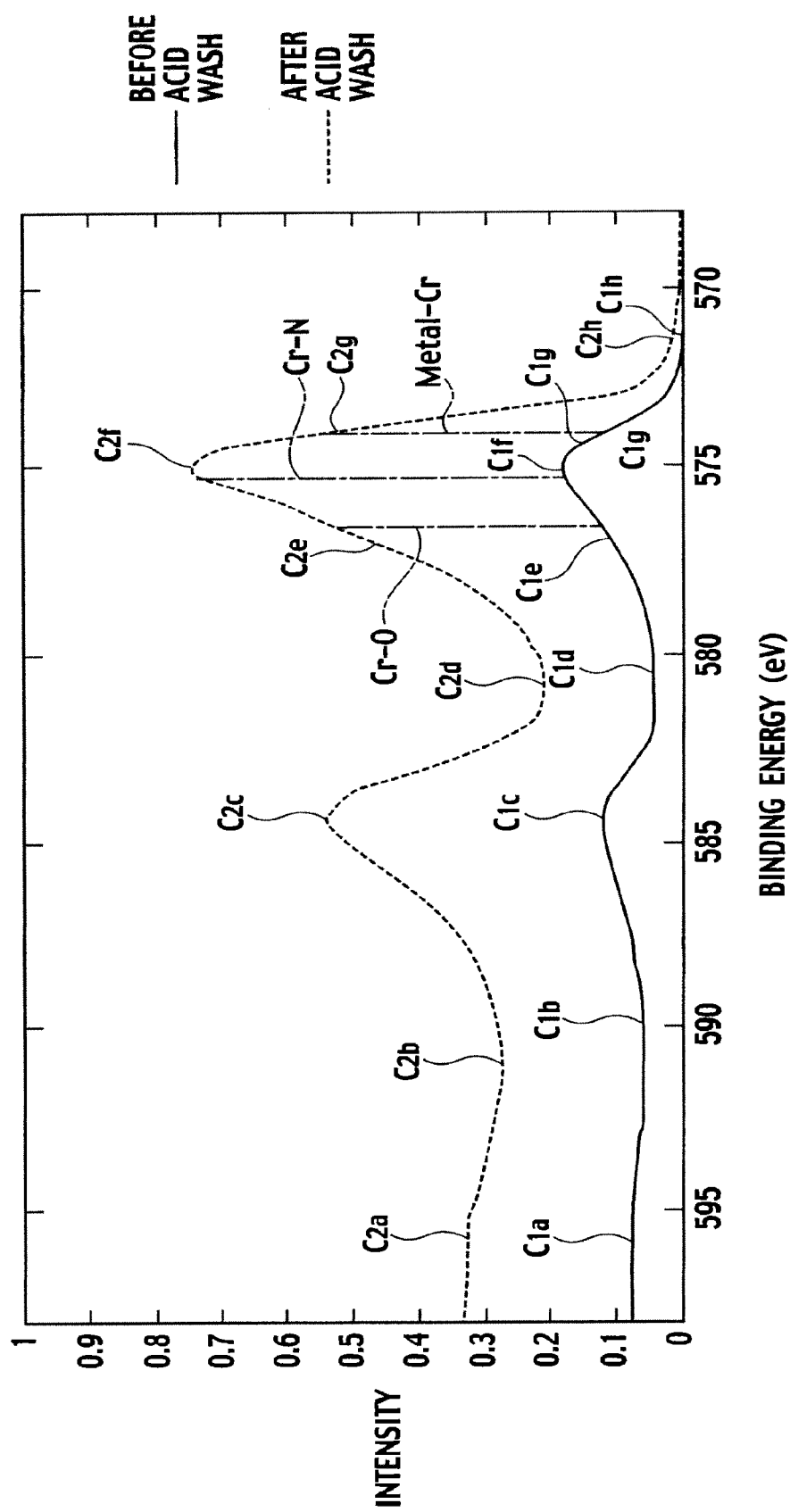
FIG. 12 shows XPS spectra of Cr-2p electrons of a nitrided layer obtained in the embodiment example 5.
Figure 13:
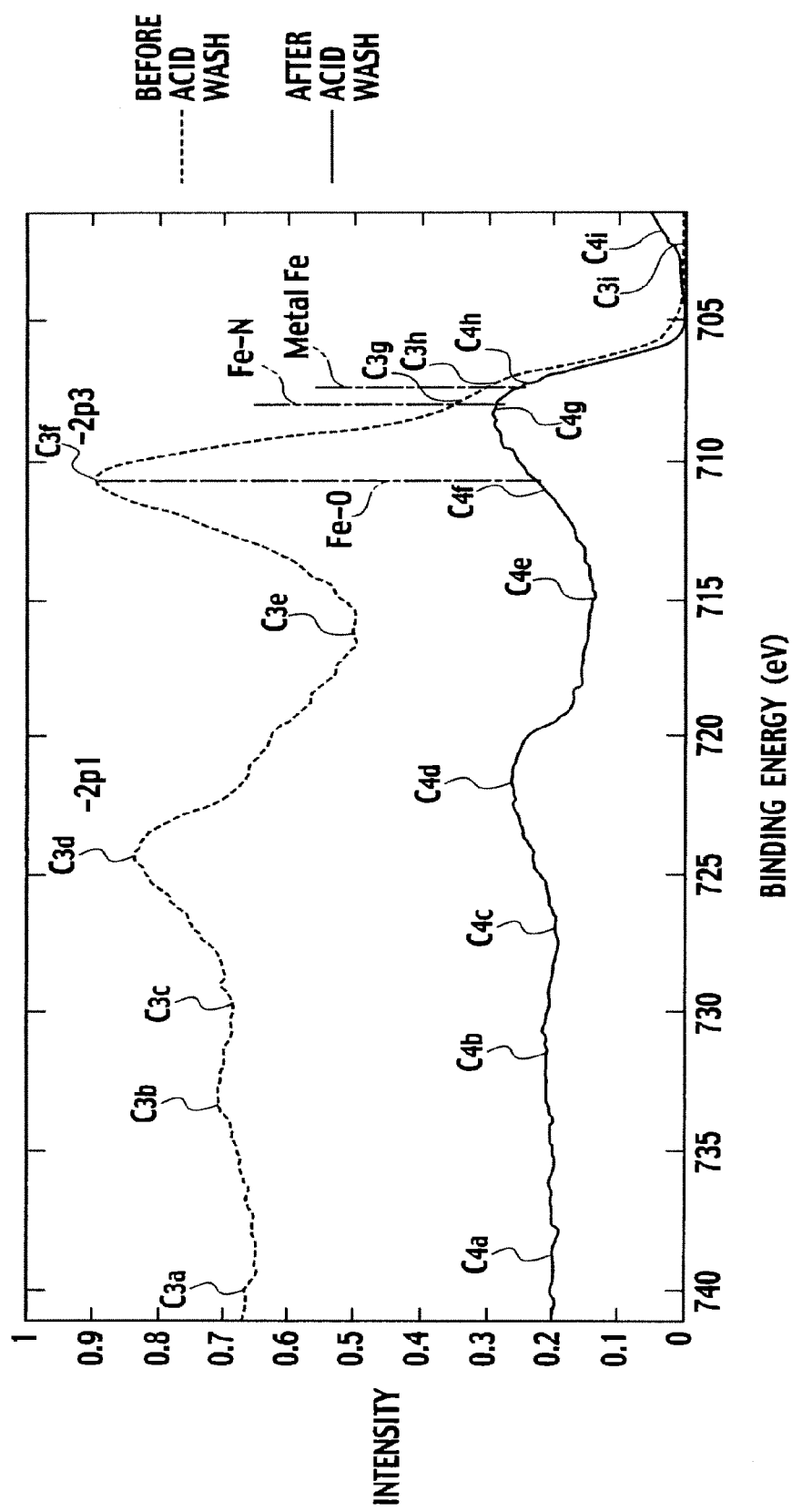
FIG. 13 shows XPS spectra of Fe-2p electrons of the nitrided layer obtained in the embodiment example 5.
Figure 14:
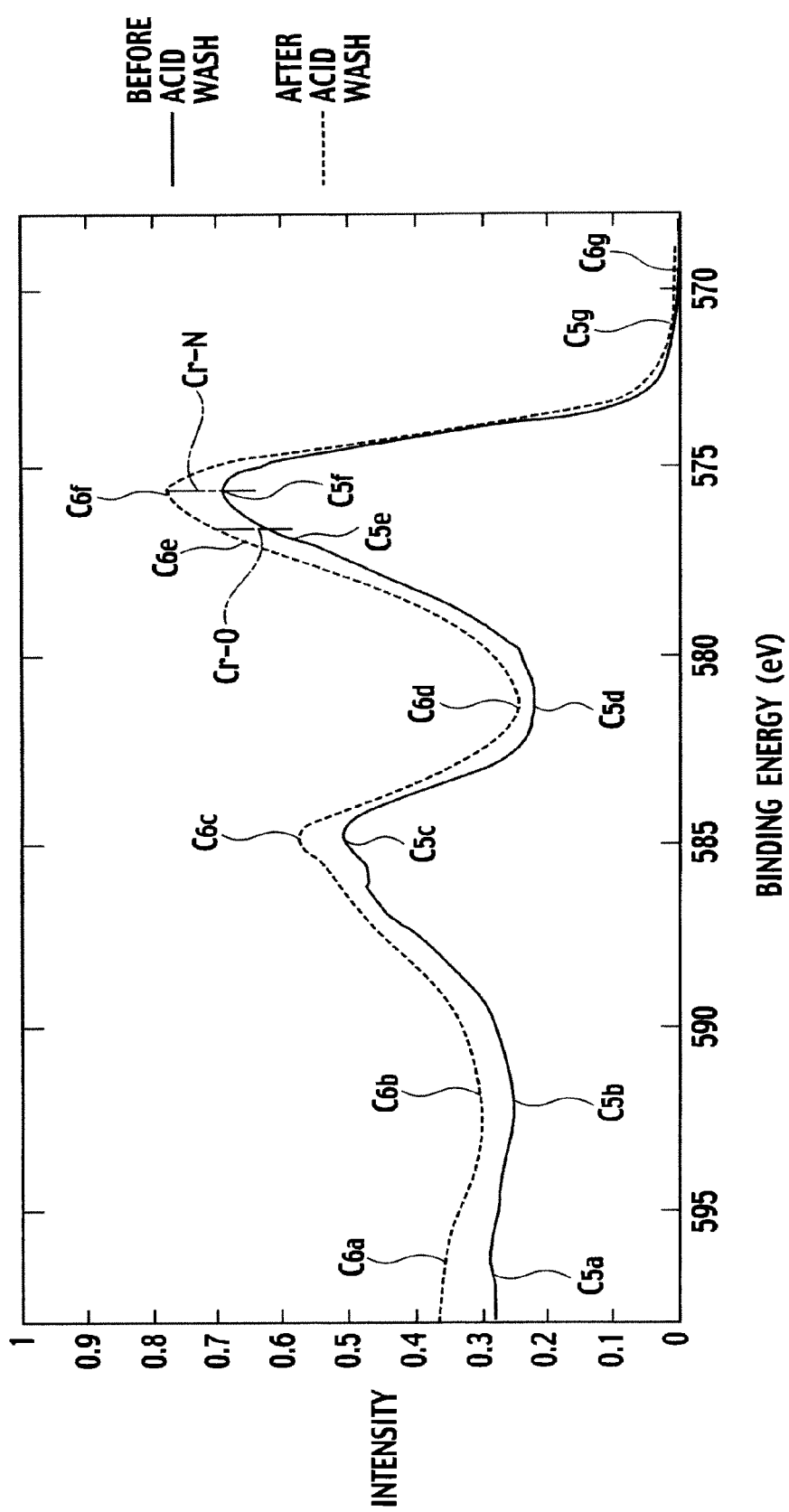
FIG. 14 shows XPS spectra of Cr-2p electrons of a nitrided layer obtained in an embodiment example 9.
Figure 15:
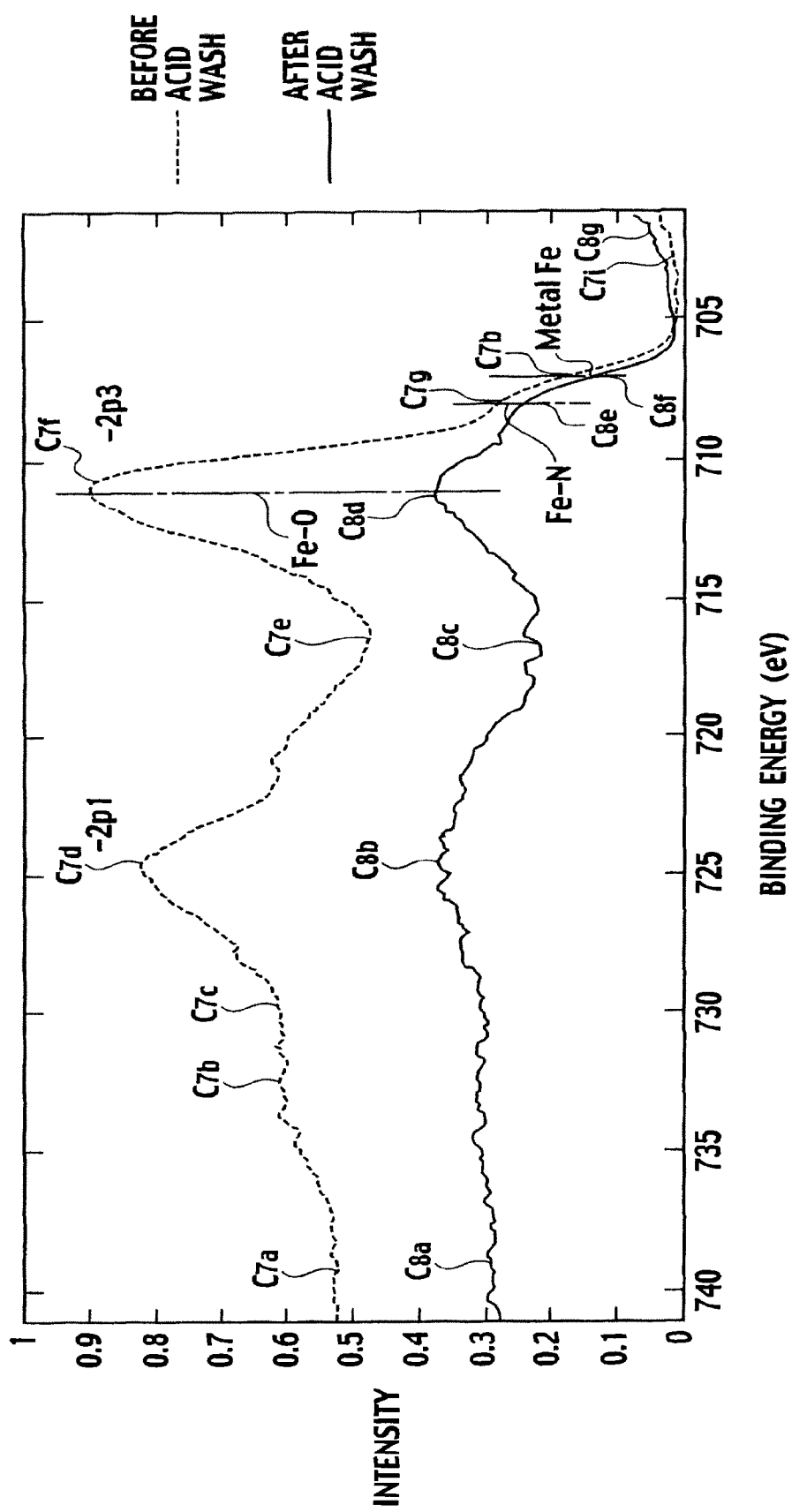
FIG. 15 shows XPS spectra of Fe-2p electrons of the nitrided layer obtained in the embodiment example 9.

Next, FIG. 12 to FIG. 15 show XPS spectra. FIG. 12 shows XPS spectra of Cr-2p electrons of nitrided layer obtained in embodiment example 5, FIG. 13 shows XPS spectra of Fe-2p electrons of nitrided layer obtained in embodiment example 5, FIG. 14 shows XPS spectra of Cr-2p electrons of nitrided layer obtained in embodiment example 9, and FIG. 15 shows XPS spectra of Fe-2p electrons of nitrided layer obtained in embodiment example 9.

In FIG. 12, a spectrum before acid wash has a substantially straight-linear linear portion C1a, a rising portion C1b, a first maximal portion C1c, a first minimal portion C1d, a C1e corresponding to a chemical shift of Cr—O, a maximal portion C1f as a second maximum corresponding to a chemical shift of Cr—N, a C1g corresponding to a chemical shift of metal-Cr, and an ending portion C1h. A spectrum after acid wash has a substantially straight-linear linear portion C2a, a first minimal portion C2b, a first maximal portion C2c, a second minimal portion C2d, a C2e corresponding to a chemical shift of Cr—O, a maximal portion C2f as a second maximum corresponding to a chemical shift of Cr—N, a C2g corresponding to a chemical shift of metal-Cr, and an ending portion C2h.

In FIG. 13, a spectrum before acid wash has a rugged but substantially straight-linear linear portion C3a, a first maximal portion C3b, a first minimal portion C3c, a second maximal portion C3d, a second minimal portion C3e, a C3f as a third maximal portion corresponding to a chemical shift of Fe—O, a C3g corresponding to a chemical shift of Fe—N, a C3h corresponding to a chemical shift of metal-Fe, and an ending portion C3i. A spectrum after acid wash has a rugged but substantially straight-linear linear portion C4a, a first maximal portion C4b, a first minimal portion C4c, a second maximal portion C4d, a second minimal portion C4e, a C4f corresponding to a chemical shift of Fe—O, a C4g as a third maximal portion corresponding to a chemical shift of Fe—N, a C4h corresponding to a chemical shift of metal-Fe, and an ending portion C4i.

In FIG. 14, a spectrum before acid wash has a substantially straight-linear linear portion C5a, a first minimal portion C5b, a first maximal portion C5c, a first minimal portion C5d, a C5e corresponding to a chemical shift of Cr—O, a maximum C5f as a second maximum corresponding to a chemical shift of Cr—N, and an ending portion C5g. A spectrum after acid wash has a substantially straight-linear linear portion C6a, a first minimal portion C6b, a first maximal portion C6c, a second mimimal portion C6d, a C6e corresponding to a chemical shift of Cr—O, a maximal portion C6f as a second maximum corresponding to a chemical shift of Cr—N, and an ending portion C6g.

In FIG. 15, a spectrum before acid wash has a rugged but substantially straight-linear linear portion C7a, a first maximal portion C7b, a first minimal portion C7c, a second maximal portion C7d, a second minimal portion C7e, a C7f as a third maximal portion corresponding to a chemical shift of Fe—O, a C7g corresponding to a chemical shift of Fe—N, a C7h corresponding to a chemical shift of metal-Fe, and an ending portion 73i. A spectrum after acid wash has a rugged but substantially straight-linear linear portion C8a, a first maximal portion C8b, a first minimal portion C8c, a maximal portion C8d as a second maximum corresponding to a chemical shift of Fe—O, a C8e corresponding to a chemical shift of Fe—N, a C8f corresponding to a chemical shift of metal-Fe, and an ending portion C8i.

As shown in FIG. 12, embodiment example 5 had before acid wash a highest relative intensity at the chemical shift of Cr—N. That is, for bond of Cr in transition metal nitride, bond between Cr atom and nitrogen atom was stronger than bond between Cr atom and oxygen atom and bond between Cr atom and metallic atom. For bond of Fe atom, as shown in FIG. 13, the relative intensity was highest at the chemical shift of Fe—O, and bond between Fe atom and oxygen atom was strongest. Such being the case, before acid wash, most of Fe atoms in nitride layer bonded with oxygen atoms. On the contrary, for XPS measurements in a condition where oxides residing by a thickness of several nm on a nitrided layer surface were removed by acid wash, as shown in FIG. 12 and FIG. 13, embodiment example 5 had a highest relative intensity at the chemical shift of Cr—N under a condition where both Cr atom and Fe atom bonded with nitrogen atoms. That is, for bond of Cr in transition metal nitride, bond between Cr atom and nitrogen atom was stronger than bond between Cr atom and oxygen atom and bond between Cr atom and metallic atom. Further, for bond of Fe atom, bond between Fe atom and nitrogen atom was stronger than bond between Fe atom and oxygen atom and bond between Fe atom and metallic atom. On the contrary, as shown in FIG. 14 and FIG. 15, embodiment example 5 had, whether before acid wash or after acid wash, a highest relative intensity at chemical shift under a condition where Cr atom bonded with nitrogen atom. For Fe atom, a peak was observed at the position of chemical shift of Fe—N after acid wash. That is, if bond of Fe and N is once verified, Fe atom has a highest relative intensity at chemical shift under a condition where it is bonded with oxygen atom, whether before acid wash or after acid wash.

From results of XPS, for chemical bond conditions of Cr and Fe in nitrided layer, it was shown that embodiment example 5 to embodiment example 7 each had a highest relative intensity, with an increased nitrogen concentration in nitrided layer, at chemical shift under a condition where Cr atom and Fe atom are both bonded with nitrogen atoms. Therefore, as shown in Table 8, contact resistance value increased after corrosion resistance test, though contact resistance value was more or less 40 m$\Omega$·cm$^2$ before and after corrosion resistance test, and the contact resistance was low even after corrosion resistance test. This is considered because of stable Cr and Fe atoms due to high nitrogen concentration in nitrided layer. Relative to this result, embodiment example 8 and embodiment example 9, which had a highest relative intensity at chemical shift pf Cr—O and a highest relative intensity at chemical shift pf Fe—O, respectively, showed low contact resistance values before corrosion resistance test, and high contact resistance values after corrosion resistance test, with results exceeding 40 m$\Omega$·cm$^2$. This is considered because of increased contact resistances due to Fe oxides formed on the surface during corrosion resistance test, as bond of Fe atom and N atom was insufficiently strong, and the bond with O atom was stronger. Further, for comparative example 3, which employed a base material made of a stainless steel non-conforming to formulas (16) to (18) below, had smaller X of $M_4N_x$ than 1.1 in $M_4N$ crystal structure, and had a highest relative intensity at chemical shift of Fe—O, although contact resistance values before corrosion resistance test was low, contact resistance values after corrosion resistance test was increased, with a result exceeding 40 m$\Omega$·cm$^2$.

$$18\ wt\% \leq Cr \leq 26\ wt\% \quad \text{formula (16)}$$

$$11\ wt\% \leq Ni \leq 21\ wt\% \quad \text{formula (17)}$$

$$0\ wt\% \leq Mo \leq 2\ wt\% \quad \text{formula (18)}$$

This is considered because of the chemical bond condition of Fe, where most bonds were Fe—O, which caused, during corrosion resistance test, Fe oxides to be formed thick on the surface, with an increased contact resistance.

Such being the case, for embodiment example 5 to embodiment example 9, in particular, for embodiment example 5 to embodiment example 7, $M_4N$ crystal structures and $\epsilon\text{-}M_{2-3}N$ crystal structures were formed, and contact resistance values before and after corrosion resistance test of each sample were low, exhibiting a favorable corrosion resistance. Like this, for embodiment example 5 to embodiment example 9, in particular, for embodiment example 5 to embodiment example 7, samples were each excellent in electrochemical stability under oxidizing environment, and had a good corrosion resistance, which is considered because nitrided layer had $M_4N$ crystal structures, permitting strong covalent bonds to be caused between transition metal atoms and nitrogen atoms, concurrently with maintained metallic bonds between transition metal atoms, allowing for metallic atoms in the nitrided layer to be chemically stable, and because it had $\epsilon\text{-}M_{2-3}N$ crystal structures, increasing nitrogen content in entire nitrided layer, causing reactivities, that transition metal atoms in transition metal nitride had against oxidation, to be yet reduced. Like this, it is considered that due to high chemical stability against oxidation of nitride, most surficial surface of nitride was kept from being oxidized after corrosion resistance test.

It is noted that although fuel cells have a theoretical voltage, which is 1.23 V per unit cell, the voltage that can be actually taken out is dropped due to reaction polarization, gas diffusion polarization, and resistance polarization, and the voltage decreases, as the current to be taken out increases. Further, in applications to automobiles, where increasing power density per unit volume or unit weight is wanted, the service tends to have a greater current density than for stationary use, e.g., a current density of 1 A/cm$^2$. For the current density of 1 A/cm$^2$, if the contact resistance between separator and carbon paper is kept within a range of 20 m$\Omega$·cm$^2$ or less, that is, if measured values by the device shown in FIG. 7(b) is kept within a range of 40 m$\Omega$·cm$^2$ or less, the efficiency reduction due to contact resistance is considered as controllable. For any of embodiment example 1 to embodiment example 7, the contact resistance is 40 m$\Omega$·cm$^2$ or less, which allows for formation of a fuel cell stack to be high of electromotive force per unit cell, excellent in power generation performance, and compact in size, with a reduced cost.

As will be seen from the foregoing description, it has been turned up that samples of embodiment example 1 to embodiment example 9 are adapted to hold low contact resistances between separator and electrodes under oxidizing environment, and excellent in corrosion resistance. It will also be seen that the nitriding treatment is effected by a plasma nitridng to be facilie and simple in operation, which allows provision of a separator for fuel cells with a maintained low contacting resistance under an oxidizing environment, an excellent corrosion resistance, and an implemented low cost. It will also be understood that by use of samples obtained in embodiment example 1 to embodiment example 9, a fuel cell stack can be formed with high electromotive force per se and per unit cell.

While embodiments of the present invention have been described, it will not be construed that description in part of the embodiment or drawing restricts this invention. It is to be understood that various substitute embodiments, embodiment examples, and technique of use will become apparent from the disclosure.

The contents of Japanese Patent Application No. 2005-261325 (filed on Sep. 8, 2005) and Japanese Patent Application No. 2005-261194 (filed on Sep. 8, 2005) are incorporated herein by reference.

INDUSTRIAL APPLICABILITY

A transition metal nitride according to the present invention can provide a necessary electrical conductivity for a separator for fuel cells, and chemical stability and corrosion resistance to maintain function of conductivity under an environment for application of separator, and is applicable to a separator for fuel cells, and the like.

The invention claimed is:

1. A separator for fuel cells, comprising:
a base material comprising a transition metal or an alloy of the transition metal;
wherein the base material comprises an austenitic stainless steel containing transition metal elements selected from among Fe, Cr, Ni, and Mo, having Fe as a principal component, meeting formulas (8) to (10) below:

$$18 wt\% \leq Cr \leq 26 wt\% \quad (8)$$

$$11 wt\% \leq Ni \leq 21 wt\% \quad (9)$$

$$0 wt\% \leq Mo \leq 2 wt\% \quad (10);$$

and
a nitrided layer of a transition metal nitride formed over a whole areas of a surface of the base material and continuously in a depth direction from the surface, the transition metal nitride obtained by a nitriding treatment of a surface of the base material, with the transition metal nitride having a crystal structure of an M4N type and a crystal structure of an ε-M2~3N type.

2. The separator for fuel cells as claimed in claim 1, wherein the base material comprises a stainless steel containing transition metal atoms selected from among Fe, Cr, Ni, and Mo.

3. The separator for fuel cells as claimed in claim 2, wherein the base material contains 18 wt% or more of Cr and 10 wt% or more of Ni.

4. The separator for fuel cells as claimed in claim 3, wherein the base material contains 25 wt% or more of Cr.

5. The separator for fuel cells as claimed in claim 1, wherein meeting formulas (11) to (13) below:

$$24 wt\% \leq Cr \leq 26 wt\% \quad (11)$$

$$14 wt\% \leq Ni \leq 20 wt\% \quad (12)$$

$$0 wt\% \leq Mo \leq 1 wt\% \quad (13)$$

6. The separator for fuel cells as claimed in claim 1, wherein the transition metal nitride is a complex tissue including a crystal layer comprising a matrix of crystal structures of the M4N type and crystal structures of the ε-M2~3N type formed in the matrix, and also has a laminate structure in which crystal structures of the M4N type and crystal structures of the ε-M2~3N type are repeatedly laminated.

7. The separator for fuel cells as claimed in claim 6, wherein the nitrided layer has crystal structures of the ε-M2~3N type within a range of inter-layer distances of several tens to 100 nm.

8. The separator for fuel cells as claimed in claim 1, wherein the crystal structure of the M4N type comprises a structure having a nitrogen atom disposed in an octahedral void at a unit cell center of a face-centered cubic lattice formed by transition metal atoms selected from among Fe, Cr, Ni, and Mo.

9. The separator for fuel cells as claimed in claim 1, wherein the transition metal nitride has a nitrogen amount of 5 at% or more and an oxygen amount of 50 at% or less in a most superficial layer down to a 5 nm depth from a most superficial surface of the base material.

10. The separator for fuel cells as claimed in claim 1, wherein the transition metal nitride has an O/N ratio of 10.0 or less for the oxygen amount to the nitrogen amount in the most superficial layer down to the 5 nm depth from the most superficial surface.

11. The separator for fuel cells as claimed in claim 1, wherein the wherein the transition metal nitride has a nitrogen amount of 10 at% or more and an oxygen amount of 30 at% or less at a 10 nm depth from a most superficial surface of the base material.

12. The separator for fuel cells as claimed in claim 1,
wherein the transition metal nitride contains transition metals selected from among Fe, Cr, Ni, and Mo, having Fe as a principal component, and
including a crystal layer comprising a matrix that has crystal structures of the M4N type having a nitrogen atom disposed in a position in an octahedral void of a face-centered cubic lattice, and crystal structures of the ε-M2~3N type that have sizes of 10 nm to 30 nm and reside in the matrix, meeting formulas (1) to (4) below:

$$(Fe1-x-y-zCrxNiyMoz)4N1.1~1.7 \quad (1)$$

$$0.19 \leq x \leq 0.28 \quad (2)$$

$$0.11 \leq y \leq 0.20 \quad (3)$$

$$0 \leq z \leq 0.01 \quad (4)$$

13. The separator for fuel cells as claimed in claim 12, wherein the crystal structures of the ε-M2~3N type are finely dispersed in the matrix, and compounded.

14. The separator for fuel cells as claimed in claim 12, wherein the transition metal nitride as claimed in claim 14 meets formulas (5) to (8) below:

$$(Fe1-x-y-zCrxNiyMoz)4N1.3~1.7 \quad (5)$$

$$0.26 \leq x \leq 0.28 \quad (6)$$

$$0.13 \leq y \leq 0.19 \quad (7)$$

$$0 \leq z \leq 0.01 \quad (8).$$

15. The separator for fuel cells as claimed in claim 12, further comprising a binding energy of Fe-2p electron by an X-ray photoelectron spectroscopy of a newly-formed surface on the transition metal nitride after acid cleaning has a highest relative intensity at a chemical shift position of Fe—N.

16. The separator for fuel cells as claimed in claim 1, wherein the crystal structures of the ε-M2~3N type have a thickness within 5 nm to 30 nm, and an inter-layer distance within several tens to 100 nm.

17. A fuel cell stack having a separator for fuel cells according to claim 1.

18. A fuel cell vehicle including a fuel cell stack according to claim 17, as a power source.

* * * * *